United States Patent
Yoshimura et al.

(10) Patent No.: US 10,855,500 B2
(45) Date of Patent: Dec. 1, 2020

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Tomoki Yoshimura, Sakai (JP); Takashi Hayashi, Sakai (JP); Shoichi Suzuki, Sakai (JP); Tatsushi Aiba, Sakai (JP); Wataru Ouchi, Sakai (JP); Liqing Liu, Sakai (JP); Kimihiko Imamura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 39 days.

(21) Appl. No.: 16/096,294

(22) PCT Filed: Apr. 13, 2017

(86) PCT No.: PCT/JP2017/015110
§ 371 (c)(1),
(2) Date: Oct. 25, 2018

(87) PCT Pub. No.: WO2017/188006
PCT Pub. Date: Nov. 2, 2017

(65) Prior Publication Data
US 2019/0140876 A1    May 9, 2019

(30) Foreign Application Priority Data
Apr. 27, 2016   (JP) ................................ 2016-088914

(51) Int. Cl.
*H04W 4/00*   (2018.01)
*H04L 27/26*   (2006.01)
(Continued)

(52) U.S. Cl.
CPC .............. *H04L 27/26* (2013.01); *H04B 1/00* (2013.01); *H04W 72/0453* (2013.01)

(58) Field of Classification Search
CPC ......................... H04W 52/146; H04W 52/325
See application file for complete search history.

(56) References Cited

U.S. PATENT DOCUMENTS

2011/0051680 A1   3/2011   Kwak et al.
2011/0142000 A1   6/2011   Han et al.
(Continued)

FOREIGN PATENT DOCUMENTS

| JP | 2011-530941 A | 12/2011 |
|---|---|---|
| WO | 2010/018977 A2 | 2/2010 |
| WO | 2016/048595 A1 | 3/2016 |

OTHER PUBLICATIONS

U.S. Appl. No. 62/307,856.
(Continued)

*Primary Examiner* — Bo Hui A Zhu
(74) *Attorney, Agent, or Firm* — ScienBiziP, P.C.

(57) ABSTRACT

A method for enabling a PUCCH with a TTI equal to or less than 1 ms. A terminal apparatus includes a transmitter configured to transmit an uplink signal on a PUCCH corresponding to a single SC-FDMA symbol, and a controller configured to determine transmit power for transmission on the PUCCH, wherein the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

6 Claims, 12 Drawing Sheets

(51) Int. Cl.
*H04B 1/00* (2006.01)
*H04W 72/04* (2009.01)

(56) References Cited

U.S. PATENT DOCUMENTS

| | | |
|---|---|---|
| 2011/0170489 A1 | 7/2011 | Han et al. |
| 2011/0205981 A1 | 8/2011 | Koo et al. |
| 2013/0094410 A1* | 4/2013 | Yang ..................... H04L 5/001 |
| | | 370/280 |
| 2014/0301324 A1 | 10/2014 | Cheng et al. |
| 2015/0124670 A1* | 5/2015 | Park ..................... H04L 1/1671 |
| | | 370/281 |

OTHER PUBLICATIONS

3rd Generation Partnership Project; Technical Specification Group Radio Access Network; Study on Latency Reduction Techniques for LTE; (Release 13) 3GPP TR 36.881 V0.6.0 (Feb. 2016).

3rd Generation Partnership Project; Technical Specification Group Radio Access Network; Evolved Universal Terrestrial Radio Access (E-UTRA); Physical layer procedure (Release 12) 3GPP TS 36.213 V12.4.0 (Dec. 2014).

\* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-088914 filed on Apr. 27, 2016, the contents of which are incorporated herein by reference.

BACKGROUND ART

The 3rd Generation Partnership Project (3GPP), which is a standardization project, standardized the Evolved Universal Terrestrial Radio Access (hereinafter, referred to as E-UTRA), in which high-speed communication is enabled by adopting an Orthogonal Frequency-Division Multiplexing (OFDM) communication method and flexible scheduling using a unit of prescribed frequency and time called a resource block.

Further, the 3GPP has been studying a method for enabling low-latency communication by configuring a Transmission Time Interval (TTI) to be shorter than conventional 1 ms (NPL 1). By configuring the TTI to be short, a Round Trip Time (RTT) which indicates a duration from a time at which a signal is transmitted to a time at which a response corresponding to the signal is returned is expected to be shorten in a physical layer. Shortening the RTT is expected to enable throughput improvement especially in a Transport Control Protocol (TCP) layer, so that throughput performance improvement over the whole radio communication system is expected.

On the other hand, in E-UTRA, a Physical Uplink Control CHannel (PUCCH) used for transmitting uplink control information in an Uplink is defined. Further, as a PUCCH format, a PUCCH format in which an identical sequence is iterated in a time direction in a duration of 1 ms is defined (NPL 2). For example, by using a PUCCH format in which an identical sequence is iterated in a time direction, communication coverage of a PUCCH can be extended.

CITATION LIST

Non Patent Literature

NPL 1: 3rd Generation Partnership Project; Technical Specification Group Radio Access Network; Study on Latency Reduction Techniques for LTE; (Release 14) 3GPP TR 36.881 V0.6.0 (2016-3).

NPL 2: 3rd Generation Partnership Project; Technical Specification Group Radio Access Network; Evolved Universal Terrestrial Radio Access (E-UTRA); (Release 12) 3GPP TS 36.213 V12.4.0 (2014-12).

SUMMARY OF INVENTION

Technical Problem

However, a method for enabling the PUCCH with a TTI equal to or less than 1 ms has not been studied sufficiently.

In light of the foregoing, an object of the present invention is to provide a terminal apparatus, a base station apparatus, and a communication method that enable efficient communication in an uplink.

Solution to Problem (1) According to some aspects of the present invention, the following measures are provided. That is, a first aspect of the present invention is a terminal apparatus that includes a transmitter configured to transmit an uplink signal on a PUCCH corresponding to a single SC-FDMA symbol, and a controller configured to determine transmit power for transmission on the PUCCH, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(2) A second aspect of the present embodiment is a base station apparatus that includes a receiver configured to receive an uplink signal on a PUCCH corresponding to a single SC-FDMA symbol, and a controller configured to indicate transmit power for the PUCCH to a terminal apparatus, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(3) A third aspect of the present embodiment is a communication method used for a terminal apparatus, the method generating a first sequence by applying a first cyclic shift to a third sequence, generating a second sequence by applying a second cyclic shift to the third sequence, generating an uplink signal based on a first sequence and a second sequence, determining transmit power on the PUCCH based on a value of the first cyclic shift and a value of the second cyclic shift, and transmitting an uplink signal on a PUCCH corresponding to a single SC-FDMA symbol.

(4) A fourth aspect of the present embodiment is an integrated circuit to be mounted on a terminal apparatus that includes a transmission circuit configured to transmit an uplink signal on a PUCCH corresponding to a single SC-FDMA symbol, and a control circuit configured to determine transmit power for transmission on the PUCCH, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(5) A fifth aspect of the present embodiment is a terminal apparatus that includes a transmitter configured to transmit an uplink signal on a PUCCH corresponding to a single SC-FDMA symbol, and a controller configured to determine a cyclic shift for transmission on the PUCCH, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

(6) A sixth aspect of the present embodiment is a base station apparatus that includes a receiver configured to receive an uplink signal on a PUCCH corresponding to a single SC-FDMA symbol, and a controller configured to indicate a cyclic shift for the PUCCH to a terminal apparatus, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

(7) A seventh aspect of the present embodiment is a communication method for a terminal apparatus, the method generating a value of a first cyclic shift and a value of a second cyclic shift based on which of an SR only, HARQ-ACK only, and both an SR and HARQ-ACK are transmitted on the PUCCH, generating a first sequence by applying the first cyclic shift to a third sequence, generating a second sequence by applying the second cyclic shift to the third sequence, generating an uplink signal based on the first sequence and the second sequence, and transmitting the uplink signal on a PUCCH corresponding to a single SC-FDMA symbol.

(8) An eighth aspect of the present embodiment is an integrated circuit to be mounted on a terminal apparatus that includes a transmission circuit configured to transmit an uplink signal on a PUCCH corresponding to a single SC-FDMA symbol, and a control circuit configured to determine a cyclic shift for transmission on the PUCCH, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

Advantageous Effects of Invention

According to the present invention, communication in an uplink can be performed efficiently.

DESCRIPTION OF EMBODIMENTS

First Embodiment

A first embodiment of the present invention will be described below. A description will be given by using a communication system (cellular system) in which a base station apparatus (base station, NodeB, or eNodeB (eNB)) and a terminal apparatus (terminal, mobile station, mobile station device, user device, or User Equipment (UE)) communicate in a cell.

Figure 1:
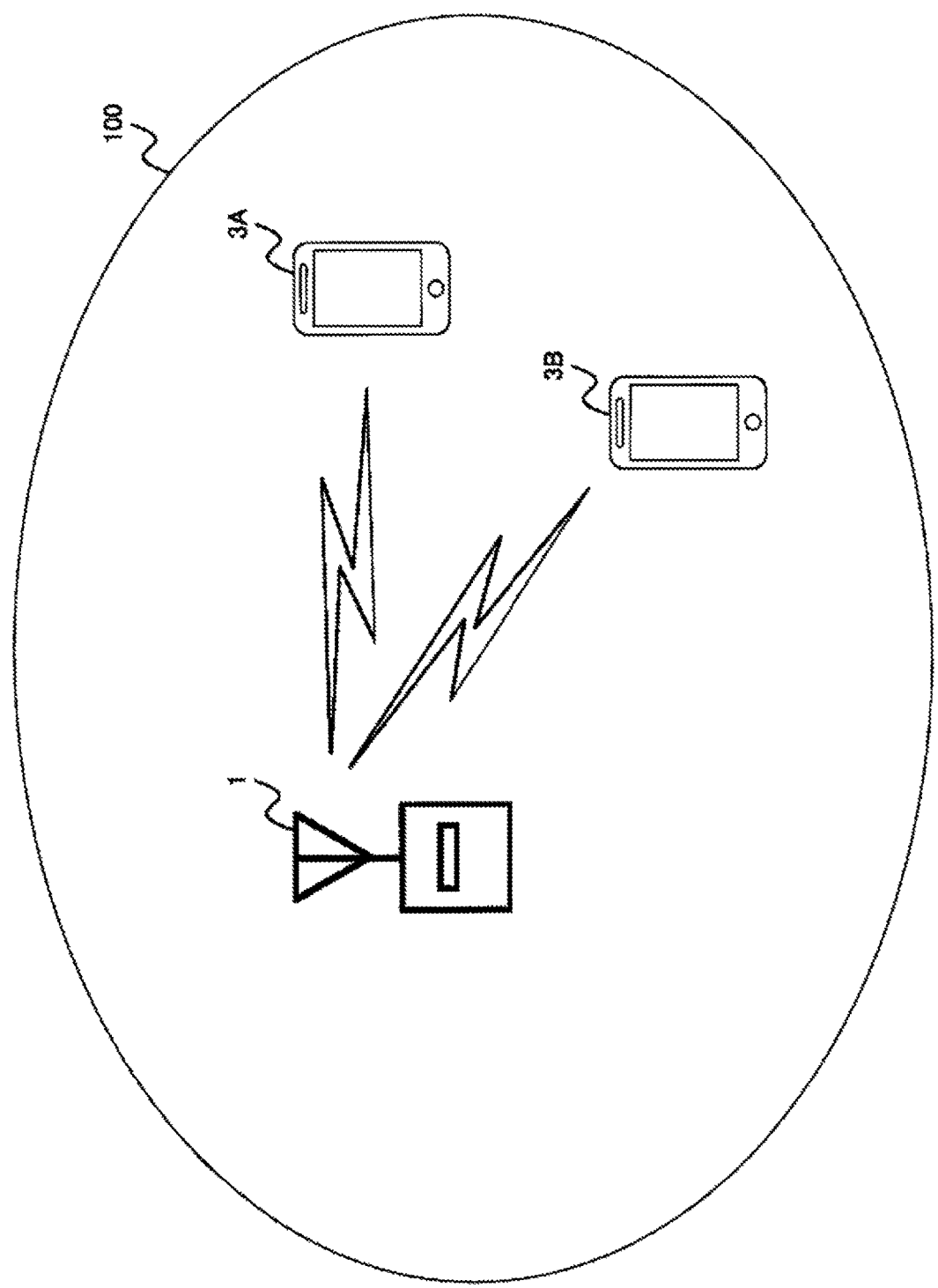
FIG. 1 is a diagram illustrating a configuration example of a communication system according to the present embodiment.

FIG. 1 is a diagram illustrating a configuration example of a communication system 100 according to the present embodiment. The communication system 100 is configured to include a base station apparatus 1, a terminal apparatus 3A, and a terminal apparatus 3B. The terminal apparatus 3A and the terminal apparatus 3B are also collectively referred to as a terminal apparatus 3. The base station apparatus 1 communicates data (a payload, physical layer data, information) with the terminal apparatus 3.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal." In the future EUTRA and Advanced EUTRA, the physical channel may be added or its configuration and format type may be changed or added; however, the description of the present embodiment will not be affected even if the channel is changed or added.

In LTE, EUTRA and Advanced EUTRA, scheduling of a physical channel or a physical signal is managed by using a radio frame. An example of a time length of one radio frame is 10 milliseconds (ms), and an example of one radio frame includes 10 subframes. In addition, an example of one subframe includes two slots. That is, an example of a time length of one subframe is 1 ms, and an example of a time length of one slot is 0.5 ms. Moreover, scheduling is managed by using a resource block as a minimum unit of scheduling for allocating a physical channel. An example of the "resource block" is defined by a given frequency domain including a set of multiple subcarriers (e.g., 12 subcarriers with a subcarrier interval of 15 kHz) on a frequency axis and a domain including a given Transmission Time Interval (TTI, slot, symbol). Note that, one subframe may be referred to as one resource block pair. Further, in LTE, one TTI may be defined as one subframe (1 ms). Note that, a TTI may be defined as a reception time interval in a receiving side. A TTI may be defined as a transmission unit or a reception unit for a physical channel or a physical signal. That is, a time length of a physical channel or a physical signal may be defined based on a length of a TTI. Further, a subframe may include one sTTI. That is, a subframe may be determined based on a length of a TTI.

Figure 2:
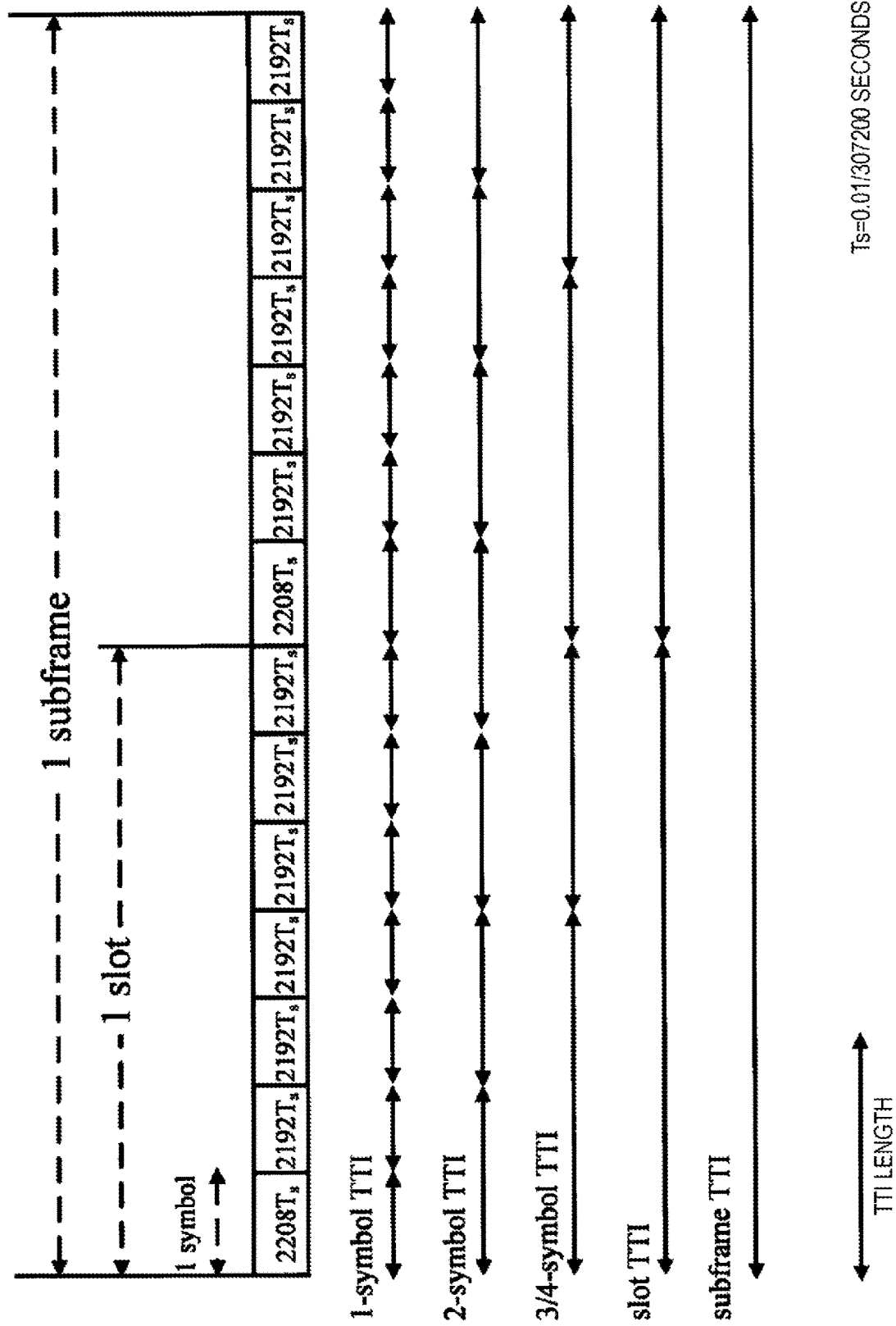
FIG. 2 is a diagram illustrating an example of a TTI according to the present embodiment.

A TTI according to the present embodiment may be defined as the number of OFDM symbols. FIG. 2 is a diagram illustrating an example of a TTI defined as the number of OFDM symbols. One subframe includes multiple OFDM symbols, and the number of OFDM symbols is 14 in the example illustrated in FIG. 2. Further, respective lengths of OFDM symbols in one subframe may be different. In the example illustrated in FIG. 2, each of a first and an eighth OFDM symbols from the left is 2208 T, seconds and the other OFDM symbols are 2192 T, seconds. Here, Ts is 0.01/307200 seconds. Further, a solid arrow indicates a length of a TTI. Note that, a length of an OFDM symbol having a subframe is not limited to the example illustrated in FIG. 2. Further, hereinafter, an OFDM symbol and an SC-FDMA symbol are also referred to as an OS. Further, in the present embodiment, an OFDM symbol and an SC-FDMA symbol may be replaced with each other.

For example, a TTI may be defined by lengths of 1, 2, 3, 4, 7, and 14 OSs. Since a value of an OS length can vary in a subframe, the TTI may include multiple TTI lengths. Further, a length of the TTI is not limited thereto.

One subframe may include a TTI indicated by a length of 1 OS. Hereinafter, the TTI including the length of 1 OS is also referred to as a 1-symbol TTI. Further, one subframe may include a TTI indicated by a length of 2 OSs. Hereinafter, the TTI indicated by the length of 2 OSs is also referred to as a 2-symbol TTI. Further, one subframe may include a TTI indicated by a length of 3 OSs and a TTI indicated by a length of 4 OSs. The TTI indicated by the length of 3 OSs is also referred to as a 3-symbol TTI and the TTI indicated by the length of 4 OSs is also referred to as 4-symbol TTI. Further, as illustrated in FIG. 2, in a case that one subframe includes 3-symbol TTIs and 4-symbol TTIs, the respective TTIs are also collectively referred to as a 3/4-symbol TTI. Further, one subframe may include a TTI indicated by a length of 7 OSs. The TTI indicated by the length of 7 OSs is also referred to as a 7-symbol TTI or a slot TTI. Further, one subframe may include a TTI indicated by a length of 14 OSs. The TTI indicated by the length of 14 OSs is also referred to as a 14-symbol TTI or a subframe TTI. Further, all the TTIs according to the present invention are also collectively referred to as an sTTI.

A TTI length may be defined as other than the number of OFDM symbols. For example, a TTI length may be defined based on a time, a frequency, a subcarrier interval, a communication method, or the like.

In EUTRA and Advanced EUTRA, a frame structure type is defined. A frame structure type 1 is applicable to Frequency Division Duplex (FDD). A frame structure type 2 is applicable to Time Division Duplex (TDD).

Figure 3:
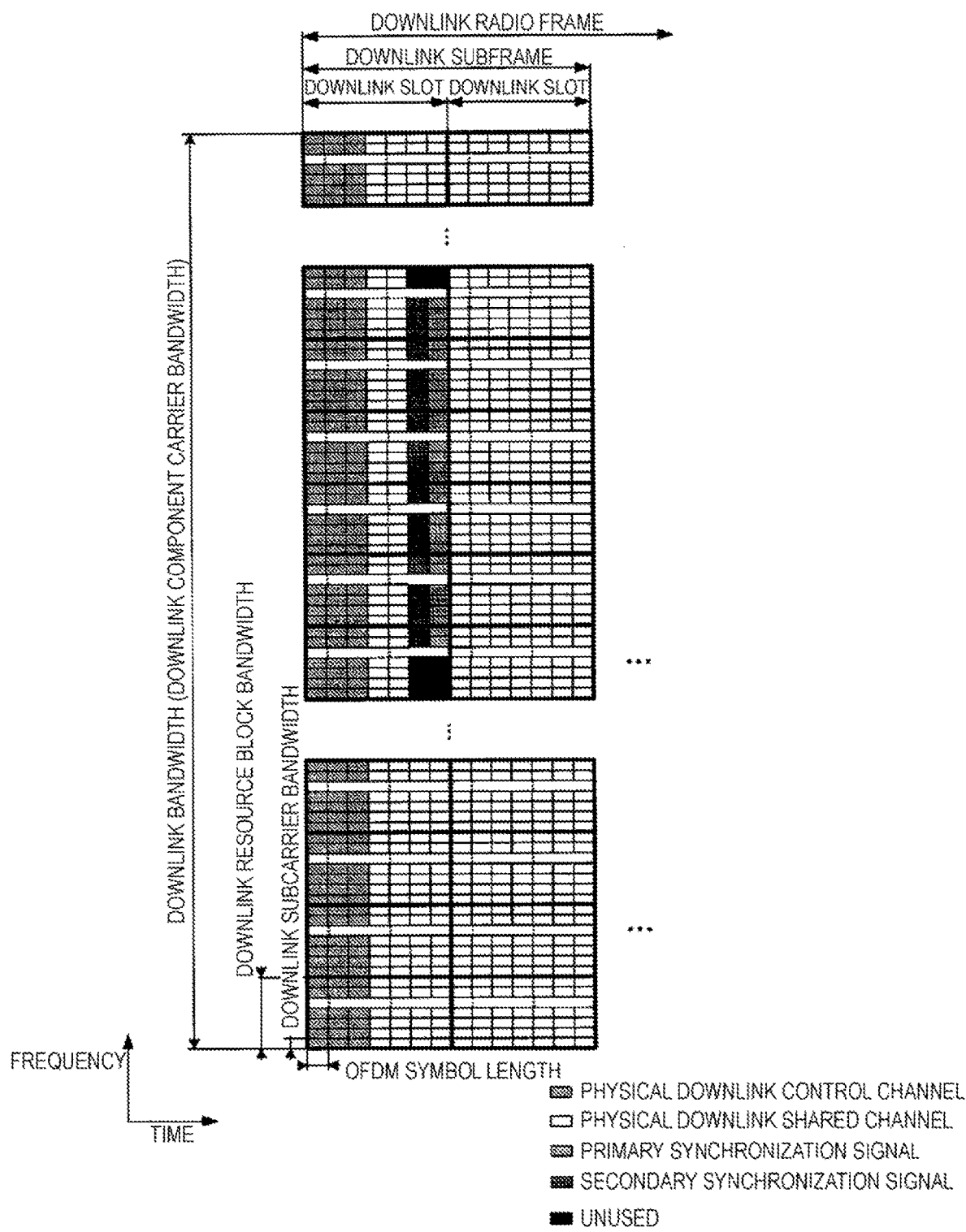
FIG. 3 is a schematic diagram illustrating an example of a downlink radio frame configuration according to the present embodiment.

FIG. 3 is a diagram illustrating an example of a downlink radio frame configuration according to the present embodiment. In a downlink, an OFDM access scheme is used. Transmission of a downlink signal and/or on a downlink physical channel in the downlink is referred to as downlink transmission. In the downlink, a PDCCH, an EPDCCH, a Physical Downlink Shared CHannel (PDSCH), and the like are allocated. A downlink radio frame includes a downlink Resource Block (RB) pair. This downlink RB pair is a unit for allocation of a downlink radio resource and the like and is based on a frequency band of a predefined width (RB bandwidth) and a time duration (two slots=1 subframe).

Each of the downlink RB pairs includes two downlink RBs (RB bandwidth×slot) that are contiguous in a time domain. Each of the downlink RBs includes 12 subcarriers in a frequency domain. In the time domain, the downlink RB includes seven OFDM symbols in a case that a normal cyclic prefix (CP) is added, while the downlink RB includes six OFDM symbols in a case that a cyclic prefix that is longer than the normal cyclic prefix is added. A region defined by a single subcarrier in the frequency domain and a single OFDM symbol in the time domain is referred to as a "Resource Element (RE)". A physical downlink control channel is a physical channel on which downlink control information such as a terminal apparatus identifier, physical downlink shared channel scheduling information, physical uplink shared channel scheduling information, a modulation scheme, coding rate, and a retransmission parameter is transmitted. Note that although a downlink subframe in a single Component Carrier (CC) is described here, a downlink subframe is defined for each CC and downlink subframes are approximately synchronized between the CCs.

Figure 4:
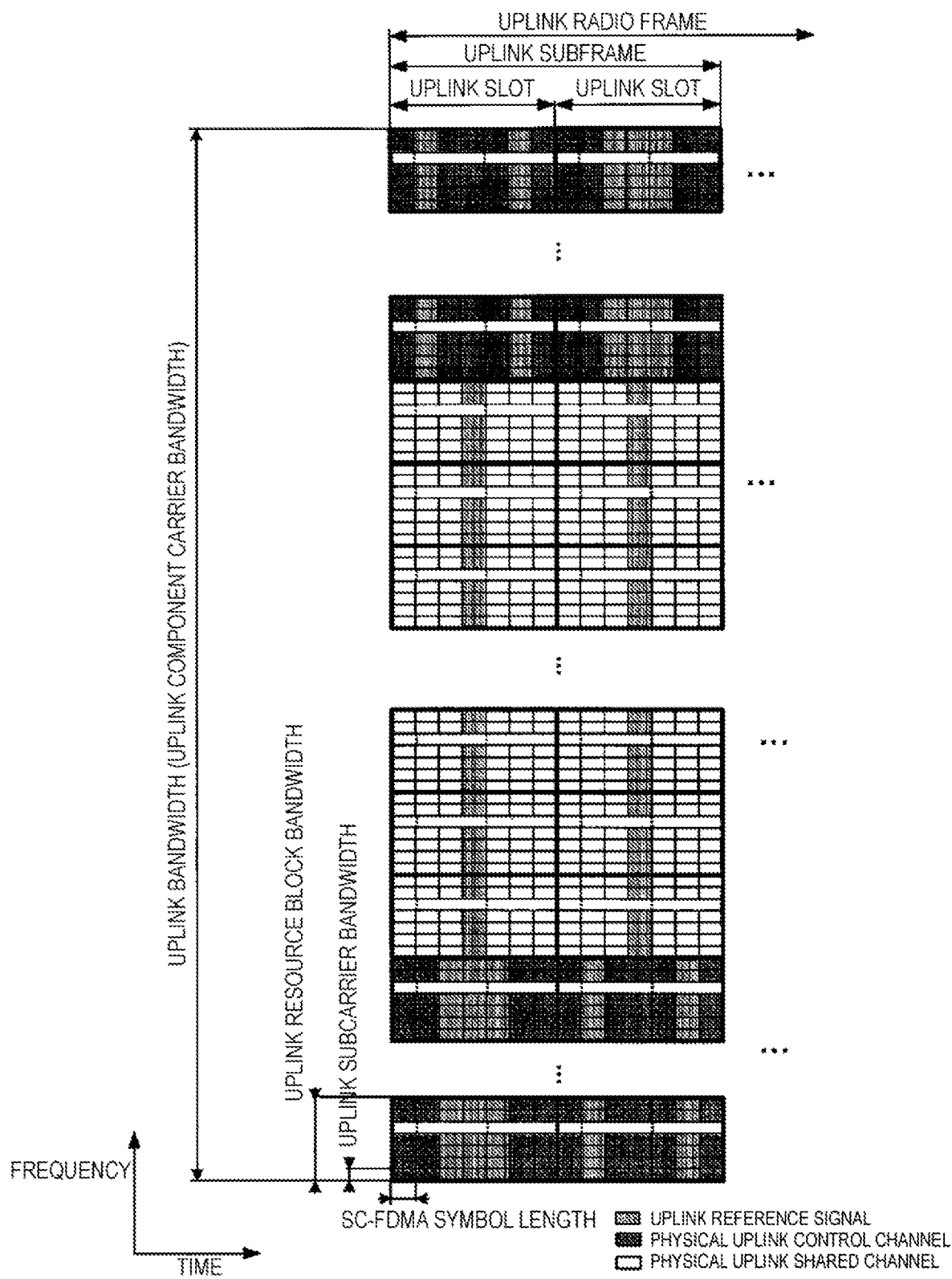
FIG. 4 is a schematic diagram illustrating an example of an uplink radio frame configuration according to the present embodiment.

FIG. 4 is a diagram illustrating an example of an uplink radio frame configuration according to the present embodiment. An SC-FDMA scheme is used in the uplink. Transmission of an uplink signal and/or on an uplink physical channel in the uplink is referred to as uplink transmission. That is, the uplink transmission can be rephrased as transmission of a PUSCH. In the uplink, a Physical Uplink Shared CHannel (PUSCH), a PUCCH, and the like are allocated. An uplink reference signal is assigned to one or some of PUSCHs and PUCCHs. An uplink radio frame includes uplink RB pairs. This uplink RB pair is a unit for allocation of uplink radio resources and the like and includes a frequency band of a predefined width (RB bandwidth) and a time duration (two slots=1 subframe). Each of the uplink RB pairs includes two uplink RBs (RB bandwidth×slot) that are contiguous in the time domain. Each of the uplink RBs includes 12 subcarriers in the frequency domain. In the time domain, the uplink RB includes seven SC-FDMA symbols in a case that a normal cyclic prefix is added, while the uplink RB includes six SC-FDMA symbols in a case that a cyclic prefix that is longer than the normal cyclic prefix is added. Note that although an uplink subframe in a single CC is described here, an uplink subframe is defined for each CC. For compensation of propagation delay and the like, the beginning of the radio frame in the uplink (uplink subframe) is adjusted to precede the beginning of the radio frame in the downlink (downlink subframe), with respect to the terminal apparatus.

A synchronization signal may include three kinds of primary synchronization signals and secondary synchronization signals including 31 kinds of codes that are interleaved in the frequency domain. 504 patterns of cell identities (Physical Cell Identity; PCIs) for identifying base station apparatuses 1, and frame timing for radio synchronization are indicated in combinations with the primary synchronization signals and the secondary synchronization signals. The terminal apparatus 3 identifies the physical cell ID of a received synchronization signal by cell search.

A Physical Broadcast CHannel (PBCH) is transmitted for notification (configuration) of a control parameter (broadcast information i.e., system information) commonly used among the terminal apparatuses 3 within the cell. The radio resource in which broadcast information is transmitted is announced on the physical downlink control channel to the terminal apparatuses 3 in the cell. Broadcast information not announced on the physical broadcast channel is transmitted, as a layer-3 message (system information) for announcing the broadcast information of the physical downlink shared channel, by the announced radio resource.

The broadcast information to be notified includes, for example, a Cell Global Identifier (CGI), which indicates a cell-specific identifier, a Tracking Area Identifier (TAI) for managing standby areas in paging, random access configuration information (such as a transmission timing timer), and shared radio resource configuration information, neighboring cell information and uplink access control information of the cell.

A downlink reference signal is classified into multiple types according to its use. For example, cell-specific Reference Signals (cell-specific RSs) are pilot signals transmitted with prescribed power from each cell and are downlink reference signals periodically repeated in the frequency domain and the time domain under a prescribed rule. The terminal apparatus 3 receives the cell-specific RS and thus measures the reception quality of each cell. The terminal apparatus 3 also uses a cell-specific RS as a reference signal for demodulation of a physical downlink control channel or a physical downlink shared channel transmitted at the same time as a cell-specific RS. A sequence distinguishable among the cells can be used for a sequence for a cell-specific RS.

The downlink reference signal is also used for estimation of downlink channel variation. The downlink reference signal used for estimation of downlink channel variation is referred to as a "Channel State Information Reference Signal (CSI-RS)". A downlink reference signal individually configured for the terminal apparatus 3 is referred to as a UE-specific Reference Signal (URS), a DeModulation Reference Signal (DMRS), or a Dedicated RS (DRS), and is referred for a channel compensation process for demodulating an enhanced physical downlink control channel or a physical downlink shared channel.

The terminal apparatus 3 needs to monitor a physical downlink control channel addressed to the terminal apparatus 3 itself, receive the physical downlink control channel addressed to the terminal apparatus 3 itself, and thus acquire, from the physical downlink control channel, radio resource allocation information called an uplink grant in a case of transmission and a downlink grant (downlink assignment) in a case of reception, before transmitting and/or receiving downlink data (PDSCH, DL-SCH) or a layer-2 message or layer-3 message, which is higher layer control information (such as a paging or handover command). Note that it is also possible to include the physical downlink control channel to be transmitted in the dedicated resource block domain allocated to each terminal apparatus 3 by the base station apparatus 1, instead of transmission through OFDM symbols described above. The uplink grant can be rephrased as a DCI format used for scheduling the PUSCH. The downlink grant can be rephrased as a DCI format used for scheduling the PDSCH. The subframe in which the PDSCH is scheduled is a subframe in which the DCI format indicating reception of the PDSCH, has been successfully decoded. The subframe in which the PUSCH is scheduled is indicated in association with the subframe in which the DCI format indicating transmission of the PUSCH has been successfully decoded. For example, for FDD cells, the subframe in which the PUSCH is scheduled is the fourth subframe following the subframe in which the DCI format indicating transmission of the PUSCH has been successfully decoded. In other words, each of the subframes in which the PUSCH and the PDSCH are scheduled is associated with the subframe in which the DCI format indicating the transmission or reception of the channel has been successfully decoded.

The Physical Downlink Control CHannel (PDCCH) occupying one or several OFDM symbols (e.g., 1 to 4 OFDM symbols) from the start of each subframe is transmitted. The Enhanced Physical Downlink Control CHannel (EPDCCH) is a physical downlink control channel allocated to the OFDM symbols to which the Physical Downlink Shared CHannel (PDSCH) is allocated. The PDCCH or the EPDCCH is used for notifying each terminal apparatus 3 of radio resource allocation information according to scheduling determined by the base station apparatus 1 and information indicating an adjustment amount for an increase or a decrease in transmit power. In the following, even in a case that the Physical Downlink Control CHannel (PDCCH) alone is described, both physical channels that is, the PDCCH and the EPDCCH, are included unless otherwise noted.

The PDCCH may be used for transmission of Downlink Control Information (DCI). The DCI transmitted by the PDCCH includes a downlink grant, uplink grant, or the like. DCI includes scheduling information on an uplink subframe and a downlink subframe.

DCI can include scheduling information on an uplink and/or a downlink sTTI. That is, the base station apparatus 1 can notify of an uplink grant and/or a downlink grant for the sTTI by transmitting the DCI to the terminal apparatus 3. In the present embodiment, the DCI including the uplink grant and/or the downlink grant for the sTTI is also referred to as sDCI. The sDCI can be transmitted by a PDCCH. Further, an sTTI can be transmitted by a region other than a PDCCH. In the present embodiment, a region other than a PDCCH having a function for transmitting sDCI is also referred to as an sPDCCH. For example, the sPDCCH may be included between a beginning OS of the sTTI and $N_{sPDCCH}$. For example, the sPDCCH may be included in part of a band of an sTTI.

Cyclic Redundancy check (CRC) parity bits are attached to the DCI format. The CRC parity bits attached to a downlink grant or an uplink grant may be scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying a terminal apparatus within a cell.

The C-RNTI is used to control the PDSCH or the PUSCH in a single subframe. The SPS C-RNTI is used to periodically allocate a resource for the PDSCH or the PUSCH.

CRC parity bits attached to the downlink grant or the uplink grant for the sTTI may be scrambled with a C-RNTI, an SPS-RNTI. The CRC parity bits attached to the downlink grant or the uplink grant for the sTTI may be scrambled with an RNTI used for allocating the sTTI (e.g., an RNTI exclusively for the sTTI and the like).

Hereinafter, a method for an uplink grant or a downlink grant for an sTTI will be described. The base station apparatus 1, for example, can divide and transmit information included in a downlink grant or an uplink grant. For example, the base station apparatus 1 may include a function for transmitting a first piece of DCI (Slow Grant, First Grant, etc.) and a second piece of DCI (Fast Grant, Second Grant) to the terminal apparatus 3. The first piece of DCI may indicate a candidate for a resource of an sPDSCH or an sPUSCH to which the terminal apparatus 3 is allocated. The first piece of DCI may include allocation information of an sPDSCH or an sPUSCH, and information on an MCS, a TTI length, or the like. The first piece of DCI may include information indicating a resource (a frequency band, a duration, the number of RBs, an RB index, etc.) on which allocation by a downlink grant or an uplink grant for an sTTI is operated, and the like. CRC parity bits attached to the first piece of DCI may be scrambled with a RNTI shared by multiple terminal apparatuses 3.

The second piece of DCI may include information on decoding an sPDSCH or an sPUSCH allocated in a resource for an sTTI allocated in advance by the first piece of DCI. For example, the second piece of DCI may include information to be used for downlink resource allocation indicating an RB to be used for data transmission, and for controlling HARQ, and the like.

DCI may be used for transmitting multiple Transmission Power Control (TPC) commands for a PUSCH of a primary cell or multiple TPC commands for a PUCCH of a primary cell. The multiple TPC commands for the PUSCH and/or the PUCCH of the primary cell are included in a DCI format 3 or a DCI format 3A. One TPC command included in the DCI format 3 includes two bits. One TPC command included in the DCI format 3A includes one bit.

The base station apparatus 1 transmits higher layer signaling including information indicating a value of a TPC-PUSCH-RNTI, information indicating a parameter tpc-index corresponding to the TPC-PUSCH-RNTI, information indicating a value of a TPC-PUCCH-RNTI, and information indicating the parameter tpc-index corresponding to the TPC-PUCCH-RNTI to the terminal apparatus 3. The base station apparatus 1 transmits higher layer signaling including information indicating to monitor the DCI format 3 or the DCI format 3A, to the terminal apparatus 3.

CRC parity bits attached to the DCI format 3/3A are scrambled with the TPC-PUSCH-RNTI or the TPC-PUCCH-RNTI.

The terminal apparatus 3, in a case that the CRC parity bits attached to the DCI format 3/3A are scrambled with the TPC-PUSCH-RNTI, determines that the DCI format 3/3A includes a TPC command for a PUSCH. The terminal apparatus 3, in a case that the CRC parity bits attached to the DCI format 3/3A are scrambled with the TPC-PUCCH-RNTI, determines that the DCI format 3/3A includes a TPC command for a PUCCH.

The DCI format 3/3A to which the CRC parity bits scrambled with the TPC-PUSCH-RNTI are attached is also referred to as a DCI format 3/3A for a PUSCH. The DCI format 3/3A to which the CRC parity bits scrambled with the TPC-PUCCH-RNTI are attached is also referred to as a DCI format 3/3A for a PUCCH.

The terminal apparatus 3, based on the parameter tpc-index given by a higher layer, determines an index of a TPC command for the terminal apparatus 3.

The base station apparatus 1 may transmit the DCI format 3/3A with a Common Search Space (CSS) of a primary cell. The terminal apparatus 3 may monitor the DCI format 3/3A with a CSS of a primary cell. The terminal apparatus 3 may attempt to decode a PDCCH/EPDCCH for the DCI format 3/3A with a CSS of a primary cell.

A downlink grant includes a TPC command for a PUCCH. An uplink grant includes a TPC command for a PUSCH.

The Physical Uplink Control CHannel (PUCCH) is used for a reception acknowledgment (HARQ-ACK; Hybrid Automatic Repeat reQuest-ACKnowledgment or ACK/NACK; ACKnowledgment/Negative ACKnowledgment) in response to reception of downlink data transmitted on the physical downlink shared channel, downlink channel (Channel State) Information (CSI), and uplink radio resource allocation request (radio resource request, Scheduling Request (SR)).

In a case that in a subframe or an sTTI/TTI in which transmission of a scheduling request is expected (or configured), a reception acknowledgment is transmitted, transmitting the scheduling request in the subframe or the sTTI/TTI is also referred to as a Positive SR, and not transmitting the scheduling request in the subframe or the sTTI/TTI is also referred to as a Negative SR. That is, the terminal apparatus 3 selectively transmits one of the positive SR and the negative SR in the subframe or the sTTI/TTI in which transmission of the scheduling request is expected (or configured).

CSI includes a Channel Quality Indicator (CQI) of a serving cell corresponding to the CSI, a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Indication may be used as a notation for each indicator. Moreover, the CQI and the PMI are classified into a wideband CQI and PMI assuming transmission using all the resource blocks in a single cell, and a subband CQI and PMI assuming transmission using some contiguous resource blocks (subbands) in a single cell. Moreover, a PMI may include a type of PMI, which represents a single preferable precoding matrix using two types of PMIs, which are a first PMI and a second PMI, in addition to a normal type of PMI, which represents a single preferable precoding matrix using a single PMI.

For example, the terminal apparatus 3 reports a CQI index that satisfies a condition that an error probability of one PDSCH transport occupying a group of downlink physical resource blocks and determined by a combination of a modulation scheme and a transport block size corresponding to the CQI index, does not exceed a prescribed value (for example, 0.1).

Note that each of the downlink physical resource blocks used to calculate the CQI, the PMI, and/or the RI is also referred to as a CSI reference resource.

The terminal apparatus 3 reports the CSI to the base station apparatus 1. The CSI reporting includes periodic CSI reporting and aperiodic CSI reporting. In the periodic CSI reporting, the terminal apparatus 3 reports the CSI at a timing configured by a higher layer. In the aperiodic CSI reporting, the terminal apparatus 3 reports the CSI at a timing based on CSI request information included in a received uplink DCI format (uplink grant) or a random access response grant.

The terminal apparatus 3 reports the CQI and/or the PMI and/or the RI. Note that the terminal apparatus 3 need not report the PMI and/or the RI depending on a configuration made by a higher layer. The configuration made by the higher layer includes, for example, a transmission mode, a feedback mode, a reporting type, and a parameter indicating whether to report the PMI/RI.

Figure 5:
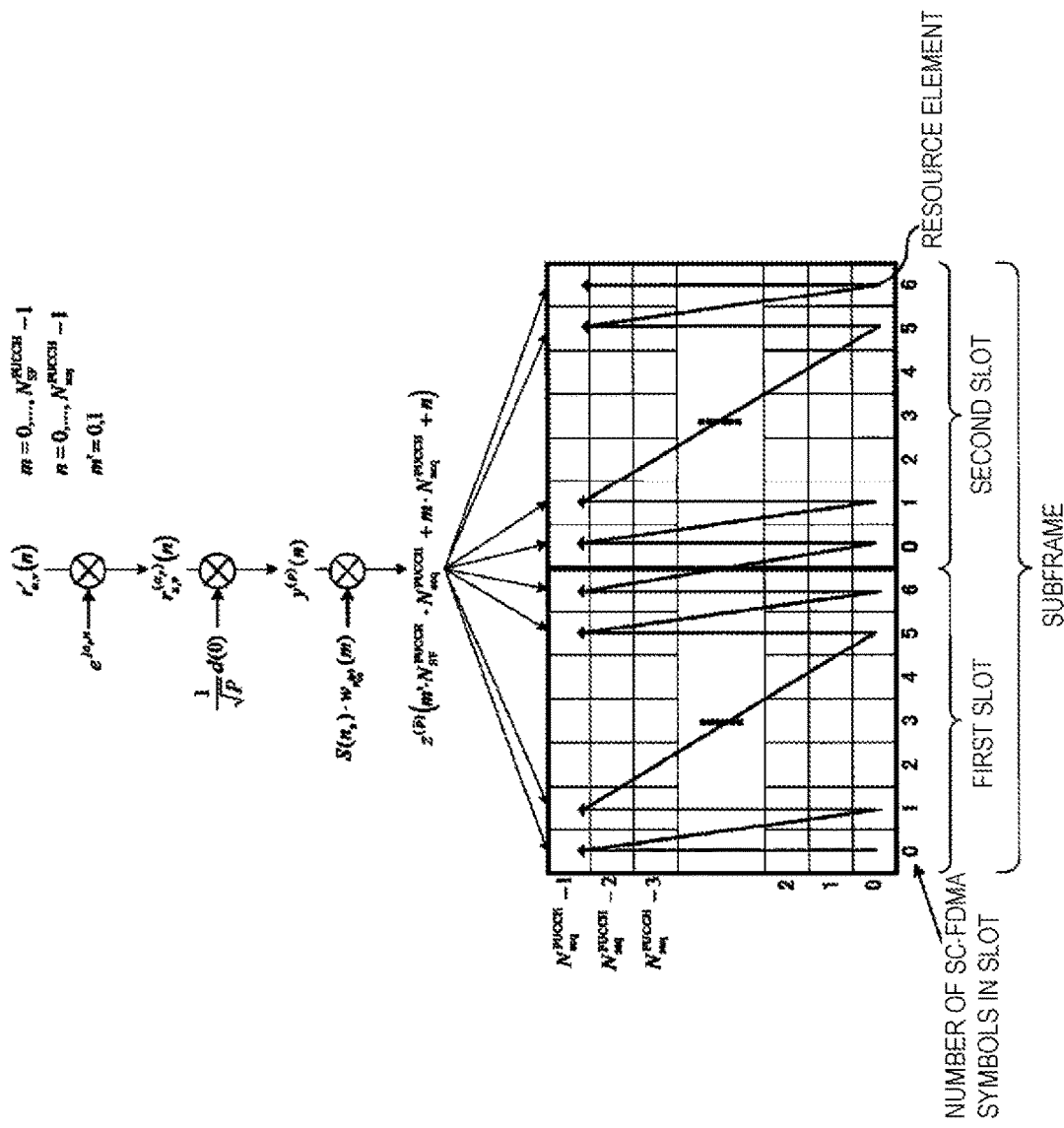
FIG. 5 is a diagram illustrating an example of a method for generating a PUCCH according to the present embodiment.

FIG. 5 is a diagram illustrating a method for generating a PUCCH according to the present embodiment. In FIG. 5, $N^{PUCCH}_{SF}$ is a spreading factor of an orthogonal sequence w(i) in a single slot, and is 4. In FIG. 5, $N^{PUCCH}_{seq}$ is the number of subcarriers included in a bandwidth of a single PUCCH, and is 12. In FIG. 5, p is an antenna port number, and P is the number of antenna ports used for transmission of a PUCCH.

First, the terminal apparatus 3 determines a sequence $r'_{u,v}(n)$. u is a sequence group number. The terminal apparatus 3 may determine a value of u at least based on a physical layer cell identity. v is a sequence number and is always 0 for a PUCCH.

Note that, the sequence group number u may hop for each slot, based on a pseudo-random sequence. The base station apparatus 1 transmits information indicating whether hopping for the sequence group number u is valid or not. Further, the terminal apparatus 3, based on the information indicating whether hopping for the sequence group number u is valid or not, determines whether to hop the sequence group number u or not.

The terminal apparatus 3 and the base station apparatus 1 store the sequence $r'_{u,v}(n)$ having a sequence length of 12 defined for each sequence group number, and read (generate) the sequence $r'_{u,v}(n)$ corresponding to the determined u.

The terminal apparatus 3 multiplies the sequence $r'_{u,v}(n)$ by $ej^{\alpha_p n}$ to generate a sequence $r^{(\alpha p)}_{u,v}(n)$. $\alpha_p$ is a phase rotation amount for each subcarrier. A phase rotation of the sequence $r'_{u,v}(n)$ in a frequency domain corresponds to a cyclic shift of an SC-FDMA symbol of a PUCCH in a time domain. Accordingly, in the present embodiment, $\alpha_p$ is also simply referred to as a cyclic shift.

The terminal apparatus 3 multiplies the sequence $r^{(\alpha p)}_{u,v}(n)$ by $1/\sqrt{p}$ and d(0) to generate a block $y^{(p)}(n)$ of a modulation symbol. d(0) is a modulation symbol generated by applying Binary Phase Shift Keying (BPSK) modulation or Quadrature Phase Shift Keying (QPSK) modulation to one-bit or two-bit HARQ-ACK, respectively.

The terminal apparatus 3 multiplies the block $y^{(p)}(n)$ of the modulation symbol by $S(n_s)$, and spreads the block $y^{(p)}(n)$ of the modulation symbol having $S(n_s)$ being multiplied by an orthogonal sequence $w_{n(p)OC}(m)$ to generate a block $z^{(p)}(*)$ of the modulation symbol. As $S(n_s)$, based on a PUCCH resource number, 1 or $e^{j\pi/2}$ is selected.

The terminal apparatus 3, in a subframe, arranges the block $z^{(p)}(*)$ of the modulation symbol in SC-FDMA symbols of {0, 1, 5, 6} of a first slot, and next, in SC-FDMA symbols of {0, 1, 5, 6} of a second slot. Note that, in a single SC-FDMA symbol, $z^{(p)}(*)$ is arranged in order from a subcarrier having a smaller number.

Hereinafter, a method for generating a DMRS will be described.

Figure 6:
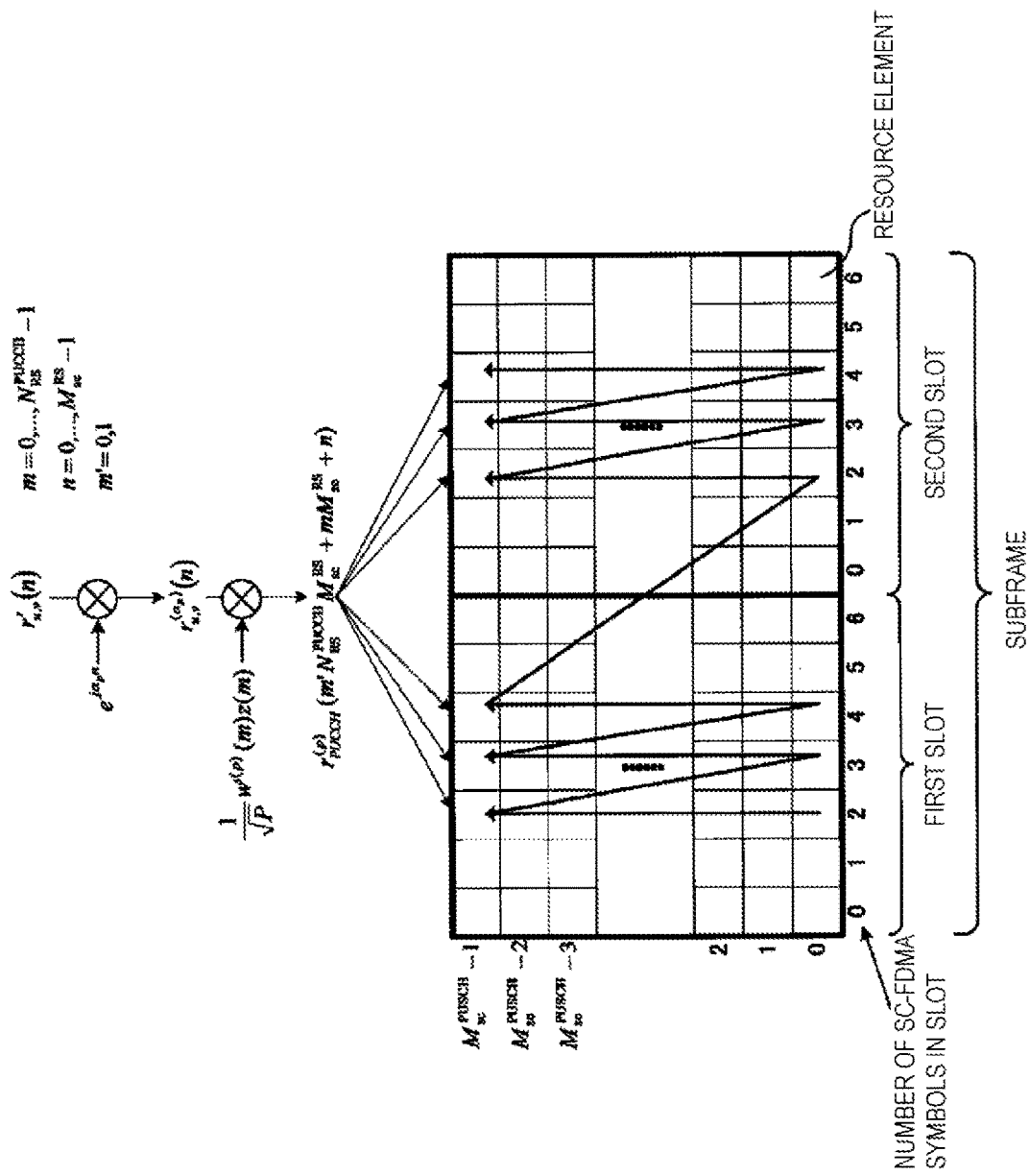
FIG. 6 is a diagram illustrating an example of a method for generating a sequence of a DMRS according to the present embodiment.

FIG. 6 is a diagram illustrating a method for generating a sequence of a DMRS according to the present embodiment. In FIG. 6, $N^{PUCCH}_{RS}$ is the number of SC-FDMA symbols used for transmitting a DMRS for a PUCCH in each single slot, and is 3. In FIG. 6, $M^{RS}_{SC}$ is a length of a reference signal sequence, and is 12.

The terminal apparatus 3, in FIG. 6, generates a sequence $r^{(\alpha p)}_{u,v}(n)$ as in a case of a PUCCH. That is, the terminal apparatus 3 may generate the sequence $r^{(\alpha p)}_{u,v}(n)$, at least based on the physical layer cell identity.

Further, the terminal apparatus 3 multiplies the sequence $r^{(\alpha p)}_{u,v}(n)$ by $1/\sqrt{p}$, $w'^{(p)}(m)$ and z(m) to generate a sequence $r^{(p)}_{PUCCH}(*)$. $w'^{(p)}(m)$ is an orthogonal sequence with respect to a DMRS. z(m) is always 1 for a DMRS of a PUCCH used for transmitting HARQ-ACK only. That is, in a case of generating the DMRS of the PUCCH used for transmitting the HARQ-ACK only, multiplication by z(m) may not necessarily be processed.

The terminal apparatus 31, in a subframe, arranges the sequence $r^{(p)}_{PUCCH}(*)$ in SC-FDMA symbols of {2, 3, 4} of a first slot, and next, in {2, 3, 4} of a second slot. Note that, in a single SC-FDMA symbol, $r^{(p)}_{PUCCH}(*)$ is arranged in order from a subcarrier having a smaller number.

Note that, in a DMRS corresponding to a single PUCCH resource, w'(i) corresponds to one of [1 1 1] and [1 $e^{j2\pi/3}$ $e^{j4\pi/3}$] and [1 $e^{j4\pi/3}$ $e^{j2\pi/3}$].

A PUCCH can be used by the terminal apparatus 3, in a case that a downlink subframe is allocated, to transmit a reception acknowledgment in response to allocated downlink data. For example, a PUCCH may be used for transmitting a reception acknowledgment in response to a PDSCH (DL-SCH, downlink data). Further, a PUCCH can be used by the terminal apparatus 3, in a case that a downlink sTTI is allocated, to perform a reception acknowledgment in response to allocated downlink data. For example, a PUCCH may be used for transmitting a reception acknowledgment in response to an sPDSCH (DL-SCH, downlink data).

Figure 7:
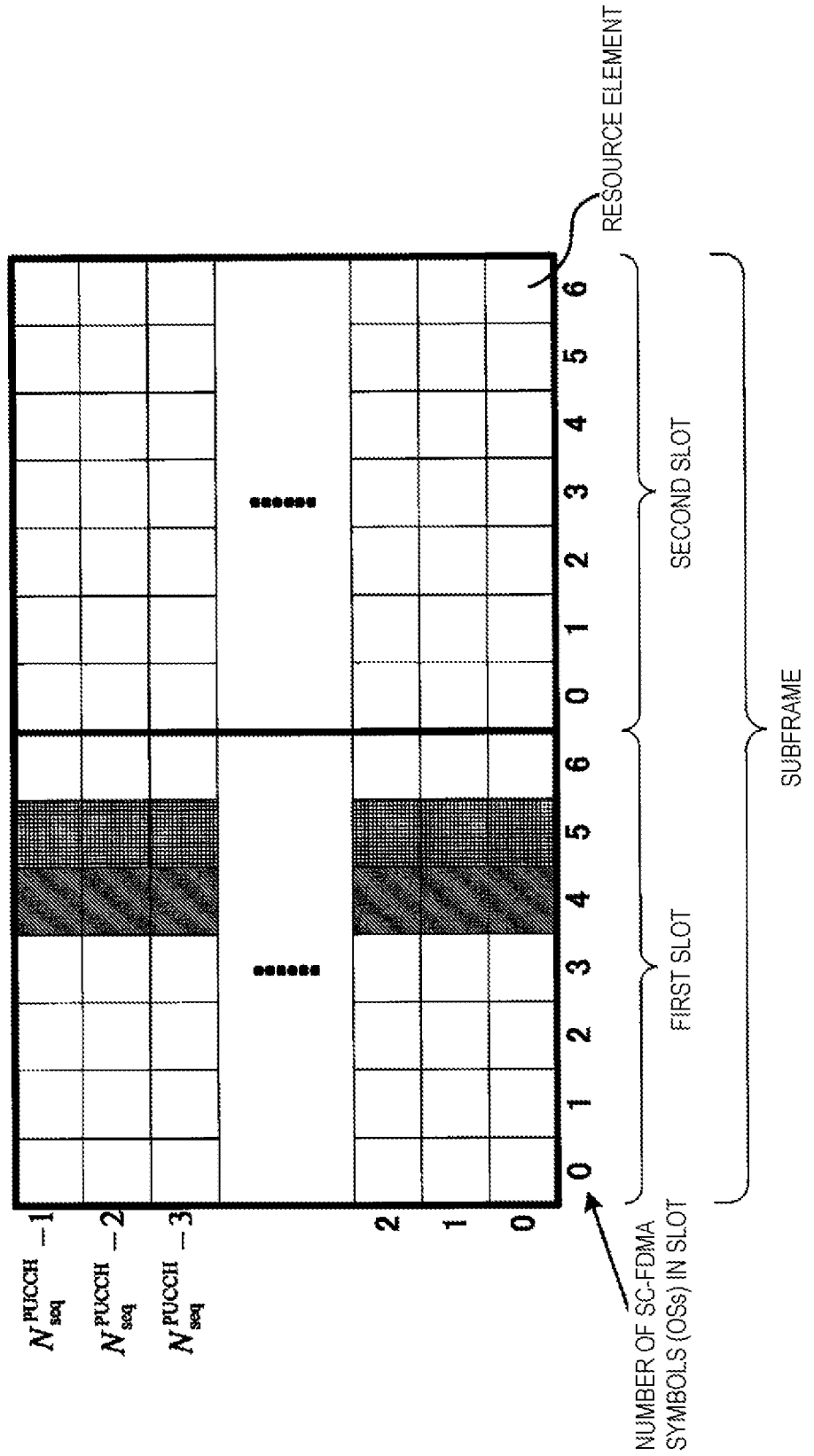
FIG. 7 is a diagram illustrating an example of a PUCCH configuration for performing a reception acknowledgment in response to downlink data allocated to an sTTI according to the present embodiment.

FIG. 7 is a diagram illustrating an example of a PUCCH configuration for performing a reception acknowledgment in response to downlink data allocated to an sTTI. For example, a reference signal for demodulation (DMRS) is allocated to an OS indicated by hatched lines, and a signal for a reception acknowledgment is allocated to an OS indicated by grids. As described above, a channel for performing a reception acknowledgment in response to downlink data allocated to an sTTI may include an sTTI. Here, the channel for performing the reception acknowledgment in response to the downlink data including the sTTI is also referred to as an sPUCCH. That is, the sPUCCH may be used for transmitting the reception acknowledgment in response to the downlink data in the sTTI. FIG. 7 illustrates an example in which an sPUCCH includes 2-symbol TTIs, but an sPUCCH according to the present embodiment is not limited to the example, and may include any sTTIs.

The Physical Downlink Shared CHannel (PDSCH) is also used to notify the terminal apparatus 3 of a response to random access (Random Access Response (RAR)) and broadcast information (system information) that is not notified by paging or the physical broadcast information channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

A PDSCH may include sTTIs. The PDSCH including the sTTIs is also referred to as an sPDSCH.

A Physical Uplink Shared CHannel (PUSCH) mainly transmits uplink data and uplink control information which may also include uplink control information such as CSI and ACK/NACK. Moreover, the physical uplink shared channel is also used such that the terminal apparatus 3 notifies the base station apparatus 1 of uplink data as well as a layer-2 message and a layer-3 message, which are higher layer control information. Radio resource allocation information of the physical uplink shared channel is provided by a physical downlink control channel, as in a case of downlink.

A PUSCH may include sTTIs. The PUSCH including the sTTIs is also referred to as an sPUSCH.

An uplink reference signal (also referred to as an "uplink pilot signal" or "uplink pilot channel") includes a DeModulation Reference Signal (DMRS) to be used by the base station apparatus 1 to demodulate the Physical Uplink Control CHannel PUCCH and/or Physical Uplink Shared CHannel PUSCH, and a Sounding Reference Signal (SRS) to be mainly used by the base station apparatus 1 to estimate an uplink channel state. Moreover, sounding reference signals are categorized into a periodic Sounding Reference Signal (Periodic SRS), which is transmitted periodically, or an Aperiodic Sounding Reference Signal (Aperiodic SRS), which is transmitted in a case that transmission is instructed by the base station apparatus 1.

A Physical Random Access CHannel (PRACH) is a channel used for notification (configuration) of a preamble sequence and includes a guard time. The preamble sequence is configured such that multiple sequences notifies the base station apparatus 1 of information. For example, in a case that 64 types of sequences are available, 6-bit information can be provided to the base station apparatus 1. A physical random access channel is used by the terminal apparatus 3 as a means for accessing the base station apparatus 1.

Moreover, the terminal apparatus 3 and the base station apparatus 1 may employ a technique for aggregating frequencies (component carriers or frequency bands) of multiple different frequency bands through carrier aggregation and treating the resultant as a single frequency (frequency band). A component carrier is categorized as an uplink component carrier corresponding to the uplink and a downlink component carrier corresponding to the downlink. In this specification, "frequency" and "frequency band" may be used synonymously.

For example, in a case that five component carriers having frequency bandwidths of 20 MHz are aggregated through the carrier aggregation, a terminal apparatus 3 capable of performing the carrier aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal apparatus 3, and the frequency bandwidths of component carriers to be aggregated may be different from each other. Each frequency bandwidth may be equal to any of the frequency bandwidths of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal apparatus 3 by the base station apparatus 1 may be the same as or may be fewer than the number of downlink component carriers.

A cell including an uplink component carrier in which an uplink control channel is configured for a radio resource request and a downlink component carrier having a cell-specific connection with the uplink component carrier is referred to as a "Primary Cell (PCell)". A cell including component carriers other than those of the primary cell is referred to as a "Secondary Cell (SCell)". The terminal apparatus 3 receives a paging message, detects update of broadcast information, performs an initial access procedure, configures security information, and the like in a primary cell, and need not perform these operations in secondary cells.

Although a primary cell is not a target of activation and deactivation controls (in other words, considered as being activated at any time), a secondary cell has activated and deactivated states, the change of which is explicitly specified by the base station apparatus 1 or is made based on a timer configured for the terminal apparatus 3 for each component carrier. The primary cell and secondary cell are collectively referred to as a "serving cell".

The carrier aggregation achieves communication using multiple component carriers (frequency bands) using multiple cells, and is also referred to as cell aggregation. The terminal apparatus 3 may have radio connection with the base station apparatus 1 via a relay station device (or repeater) for each frequency. In other words, the base station apparatus 1 of the present embodiment may be replaced with a relay station device.

The base station apparatus 1 manages a cell, which corresponds to an area where terminal apparatuses 3 can communicate with the base station apparatus 1, for each frequency. A single base station apparatus 1 may manage multiple cells. Cells are classified into multiple types of cells depending on the size of the area (cell size) that allows for communication with terminal apparatuses 3. For example, cells are classified into macro cells and small cells. Moreover, small cells are classified into femto cells, pico cells, and nano cells depending on the size of the area. In a case that a terminal apparatus 3 can communicate with a certain base station apparatus 1, the cell configured so as to be used for the communication with the terminal apparatus 3 is referred to as a "Serving cell" while the other cells not used for the communication are referred to as "Neighboring cells", among the cells of the base station apparatus 1.

In other words, in the carrier aggregation (also referred to as "carrier aggregation"), multiple serving cells thus configured include a single primary cell and one or more secondary cells.

A primary cell is a serving cell in which an initial connection establishment procedure has been performed, a serving cell in which a connection re-establishment procedure has been started, or a cell indicated as a primary cell during a handover procedure. The primary cell operates at a primary frequency. At the point of time when a connection is (re)established, or later, a secondary cell may be configured. Each secondary cell operates at a secondary frequency. The connection may be referred to as an RRC connection. For the terminal apparatus 3 supporting CA, a single primary cell and one or more secondary cells are aggregated.

A basic configuration (architecture) of dual connectivity will be described below. For example, a description will be given in a case that a terminal apparatus 3 connects to multiple base station apparatuses 1 (for example, a base station apparatus 1-1 and a base station apparatus 1-2) at the same time. The base station apparatus 1-1 is a base station apparatus having a macro cell, and the base station apparatus 1-2 is a base station apparatus having a small cell. Connecting the terminal apparatus 3 to the multiple base station apparatuses 1 at the same time by using multiple cells belonging to multiple base station apparatuses 1 as described above is referred to as "dual connectivity". The cells belonging to the respective base station apparatuses 1 may be operated at the same frequency or different frequencies.

Note that the carrier aggregation is different from the dual connectivity in that a single one of the base station apparatuses 1 manages multiple cells and the frequencies of the respective cells are different from each other. In other words, the carrier aggregation is a technique for connecting the single terminal apparatus 3 and a single one of the base station apparatus 1 via multiple cells having different frequencies, while the dual connectivity is a technique for connecting the single terminal apparatus 3 and the multiple base station apparatuses 1 via multiple cells having the same frequency or different frequencies.

The terminal apparatus 3 and the base station apparatuses 1 can apply a technique used for the carrier aggregation, to the dual connectivity. For example, the terminal apparatus 3 and the base station apparatuses 1 may apply a technique of allocation of a primary cell and secondary cells or activation/deactivation, or the like, to cells connected through the dual connectivity.

Transmit power control for transmission on a PUCCH in the present embodiment will be described below.

The terminal apparatus 3, in a case of transmitting on a PUCCH, sets a transmit power value for transmission on a PUCCH in a certain subframe i for a certain cell c, based on Equation (1). $P_{real\_PUCCH,c}(i)$ in Equation (1) is defined based on Equation (2).

$$P_{PUCCH,c}(i)=\min(P_{CMAX,c}, P_{real\_PUCCH,c}(i)) \text{ [dBm]} \quad \text{[Equation 1]}$$

$$P_{real\_PUCCH,c}(i)=P_{O\_PUCCH,c}+PL_c+h(n_{CQI},n_{HARQ})+\Delta_{F\_PUCCH}(F)+g(f) \quad \text{[Equation 2]}$$

Here, $P_{real\_PUCCH,c}(i)$ is a power value calculated (estimated) based on a real transmission for a PUCCH. Further, calculation (estimation) of a power value based on a real transmission for a PUCCH implies calculation (estimation) of a power value based on a real transmission on a PUCCH.

Here, $P_{PUCCH,c}(i)$ indicates a transmit power value for transmission on a PUCCH in an i-th subframe. $P_{O\_PUCCH,c}$ is a parameter indicating transmit power that is a base for transmission on a PUCCH, and is indicated by a higher layer. $P_{O\_PUCCH,c}$ includes $P_{O\_NOMINAL\_PUCCH,c}$ and $P_{O\_UE\_PUCCH,c}$. Each of $P_{O\_NOMINAL\_PUCCH,c}$ and $P_{O\_UE\_PUCCH,c}$ is supported by the higher layer. Here, $P_{O\_NOMINAL\_PUCCH,c}$ and $P_{O\_UE\_PUCCH,c}$ may be determined based on a PUCCH format (a method for an sPUCCH/PUCCH may be used). Further, $P_{O\_NOMINAL\_PUCCH,c}$ and $P_{O\_UE\_PUCCH,c}$ may be determined based on the number of bits of a scheduling request to be transmitted.

$h(n_{CQI},n_{HARQ})$ is a value calculated based on the number of bits to be transmitted on a PUCCH and a PUCCH format. That is, $h(n_{CQI},n_{HARQ})$ may be determined based on a PUCCH format (a method for an sPUCCH/PUCCH may be used). Here, $n_{CQI}$ indicates the number of bits of channel state information to be transmitted on a PUCCH, and $n_{HARQ}$ indicates the number of bits of HARQ-ACK to be transmitted on a PUCCH. Here, $h(n_{CQI},n_{HARQ})$ may include the number of bits of a scheduling request to be transmitted on a PUCCH. That is, in Equation (2), $h(n_{CQI},n_{HARQ},n_{SR})$ may be used instead of $h(n_{CQI},N_{HARQ})$. Note that, $n_{SR}$ may be associated with the number of bits of a scheduling request to be transmitted. For example, $h(n_{CQI},n_{HARQ},1)=X_{SR},h(n_{CQI},n_{HARQ},0)=X_0$ may hold. $X_{SR}$ and $X_0$ are values of $h(n_{CQI},n_{HARQ},n_{SR})$, in a case that a scheduling request of 1 bit is transmitted, and in a case that no scheduling request is transmitted, respectively. For example, $X_{SR}=0$, $X_0=10*\log_{10}(2)$. $X_{SR}$ and $S_0$ may be determined based on $n_{CQI}$ and $n_{HARQ}$.

$\Delta_{F\_PUCCH}(F)$ is an offset value indicated by a higher layer for each PUCCH format. That is, an offset value may be indicated for each PUCCH format (a method for an sPUCCH/PUCCH may be used). For example, $\Delta_{F\_PUCCH}(F)$ for a PUCCH format 1a is always 0. For example, in a case that a scheduling request is transmitted, for an sPUCCH/PUCCH, $\Delta_{F\_PUCCH}(F)=0$, and in a case that no scheduling request is transmitted, $\Delta_{F\_PUCCH}(F)=10*\log_{10}(2)$ may be hold.

The terminal apparatus 3 may set a value of g(i) based on Equation (3).

$$g(i)=g(i-1)+\delta_{PUCCH}(i-K_{PUCCH})$$

Here, $\delta_{PUCCH}$ is a correction value, and is referred to as a TPC command. That is, $\delta_{PUCCH}(i-K_{PUCCH})$ indicates a value accumulated in g(i-1). Further, $\delta_{PUCCH}(i-K_{PUCCH})$ is indicated based on a value set in a field of a TPC command for a PUCCH included in the DCI format 3/3A for a downlink grant and a PUCCH, for a certain cell received in a certain subframe $(i-K_{PUCCH})$.

For example, a value set in a field (2-bit information field) of a TPC command for a PUCCH included in the DCI format 3 for a downlink grant and a PUCCH is mapped to accumulated correction values $\{-1, 0, 1, 3\}$. For example, a value set in a field (1-bit information field) of a TPC command for a PUCCH included in the DCI format 3A for a PUCCH is mapped to accumulated correction values $\{--1, 1\}$.

A value of $K_{PUCCH}$ is, for example, 4. A value of KPUCCH may be determined based on an sTTI/TTI length of a PUCCH or an sTTI/TTI length of a PDSCH corresponding to a reception acknowledgment included in an sPUCCH.

An example of a method of an sPUCCH according to the present embodiment (method 1) is a sequence determined based on Equation (4).

$$S_1(n)=r'_{u,v}(n)e^{j\alpha_1 n}+d(0)r'_{u,v}(n)e^{j\alpha_2 n} \quad \text{[Equation 4]}$$

Here, $S_1$ is a sequence of an sPUCCH, and each of $\alpha_1$ and $\alpha_2$ is a cyclic shift. Here, a method of the sequence $S_1$ of the sPUCCH is also referred to as the method 1. Note that, hereinafter, a sequence $r'_{u,v}(n)$ is also referred to as r(n). Further, a sequence based on α1 (a first term in the right side of Equation (4)) is also referred to as a reference signal sequence. Further, a sequence based on $\alpha_2$ (a second term in the right side of Equation (4)) is also referred to as a data sequence. Further, the first term in the right side of Equation (4) is also referred to as a first (or a second) sequence, and $\alpha_1$ is also referred to as a first (or a second) cyclic shift. Further, the second term in the right side of Equation (4) is also referred to as the second (or the first) sequence, and $\alpha_2$ is also referred to as the second (or the first) cyclic shift.

Here, the method 1 is a method in which multiple sequences to which different cyclic shifts are multiplied (applied) are included in a single SC-FMDA symbol. An sPUCCH sequence $S_1$ transmitted by the terminal apparatus 3 can be received by the base station apparatus 1. For example, the base station apparatus 1, by performing correlation processing for the received sPUCCH sequence $S_1$ with r(n), can detect the cyclic shifts $\alpha_1$ and $\alpha_2$. Next, the base station apparatus 1, by detecting phase differences and the like of sequences to which the different cyclic shifts $\alpha_1$ and $\alpha_2$ are applied, can estimate d(0).

An sPUCCH may be used at least for transmitting an SR and a reception acknowledgment (also referred to as an ACK/NACK, an A/N, etc.). In other words, information transmitted using an sPUCCH is information indicating at least an SR only, an A/N only, and an SR+an A/N (an SR and an A/N) (hereinafter, also referred to as uplink control information including information indicating an SR only, an A/N only, and an SR+an A/N).

Values of the cyclic shifts $\alpha_1$ and/or $\alpha_2$ may be associated with an SR. That is, in a case that $\alpha_1$ and/or $\alpha_2$ indicates a specific value, the base station apparatus 1 may interpret that an SR is transmitted. That is, based on the values of $\alpha_1$ and/or $\alpha_2$, which of a positive SR and a negative SR is transmitted may be indicated. Further, a difference between the cyclic shifts $\alpha_1$ and $\alpha_2$ may be associated with an SR. That is, in a case that the difference between $\alpha_1$ and $\alpha_2$ indicates a specific value, the base station apparatus 1 may interpret that an SR is transmitted. That is, based on the difference between $\alpha_1$ and/or $\alpha_2$, which of a positive SR and a negative SR is transmitted may be indicated.

A value of d(0) may be associated with an SR. That is, in a case that d(0) indicates a specific value (modulation symbol value, bit sequence, etc.), the base station apparatus 1 may interpret that an SR is transmitted. That is, based on the value of d(0), which of a positive SR and a negative SR is transmitted may be indicated.

Values of the cyclic shifts $\alpha_1$ and/or $\alpha_2$ may be associated with an A/N. That is, in a case that $\alpha_1$ and/or $\alpha_2$ indicates a specific value, the base station apparatus 1 may interpret that an A/N is transmitted. Further, the difference between the cyclic shifts $\alpha_1$ and $\alpha_2$ may be associated with an A/N. That is, based on the values of $\alpha_1$ and/or $\alpha_2$, which of ACK and NACK is transmitted may be indicated. That is, in a case that the difference between $\alpha_1$ and $\alpha_2$ indicates a specific value, the base station apparatus 1 may interpret that an A/N is transmitted. That is, based on the difference between $\alpha_1$ and/or $\alpha_2$, which of ACK and NACK is transmitted may be indicated.

A value of d(0) may be associated with an A/N. That is, in a case that d(0) indicates a specific value (modulation symbol value, bit sequence, etc.), the base station apparatus 1 may interpret that an A/N is transmitted. That is, based on the value of d(0), which of ACK and NACK is transmitted may be indicated.

Here, a value of $\alpha_1$, a value of $\alpha_2$, and a value of d(0) may be associated with an SR. That is, in a case that each of $\alpha_1$, $\alpha_2$, and d(0) indicates a specific value, the base station apparatus 1 may interpret that an SR is transmitted. That is, based on $\alpha_1$, $\alpha_2$, and d(0), which of a positive SR and a negative SR is transmitted may be indicated.

Here, a value of $\alpha_1$, a value of $\alpha_2$, and a value of d(0) may be associated with an A/N. That is, in a case that each of $\alpha_1$, $\alpha_2$, and d(0) indicates a specific value, the base station apparatus 1 may interpret that an A/R is transmitted. That is, based on $\alpha_1$, $\alpha_2$, and d(0), which of ACK and NACK is transmitted may be indicated.

Here, in the method 1, an appropriate cyclic shift can be allocated to each piece of uplink control information. That is, an appropriate cyclic shift can be allocated to each of an SR only, an A/N only, and an SR+an A/N.

In an example of an allocation method of a cyclic shift to uplink control information in an sPUCCH based on the method 1 (hereinafter, an allocation method 1), in a case that an SR only is transmitted, $(\alpha_1, \alpha_2)=(\alpha_A,\alpha_B)$ may hold. Further, in a case that an A/N only is transmitted, $(\alpha_1,\alpha_2)=(\alpha_A,\alpha_C)$ may hold. Further, in a case that an SR+an A/N are transmitted, $(\alpha_1,\alpha_2)=(\alpha_B, \alpha_C)$ may hold. Here, each of $\alpha_A$, $\alpha_B$ and $\alpha_C$ may indicate a different cyclic shift amount.

That is, as $\alpha_1$ in the case that an SR only is transmitted and $\alpha_1$ in the case that an A/N only is transmitted, an identical cyclic shift amount ($\alpha_A$) may be used. Further, as $\alpha_2$ in the case that an SR only is transmitted and $\alpha_1$ in the case that an SR+an A/N are transmitted, an identical cyclic shift amount ($\alpha_B$) may be used. Further, as $\alpha_2$ in the case that an A/N only is transmitted and $\alpha_2$ in the case that an SR+an A/N are transmitted, an identical cyclic shift amount ($\alpha_C$) may be used.

Further, in another example of the allocation method of the cyclic shift to the uplink control information in the sPUCCH based on the method 1 (hereinafter, an allocation method 2), in the case that an SR only is transmitted, $(\alpha_1, \alpha_2)=(\alpha_A,\alpha_A)$ may hold. Further, in the case that an A/N only is transmitted, $(\alpha_1,\alpha_2)=(\alpha_A,\alpha_C)$ may hold. Further, in the case that an SR+an A/N are transmitted, $(\alpha_1,\alpha_2)=(\alpha_A,\alpha_C)$ may hold. That is, in an sPUCCH on which an SR only is transmitted, since d(0) in Equation (4) is not used, by setting $\alpha_1=\alpha_2=\alpha_A$, simplification of a configuration of the terminal apparatus 3 or the base station apparatus 1, improvement of transmission efficiency, detection performance, or the like is expected.

That is, in the case that an SR only is transmitted, as $\alpha_1$ and $\alpha_2$, an identical cyclic shift amount ($\alpha_A$) may be used. Further, as $\alpha_1$ ($\alpha_2$) in the case that an SR only is transmitted and $\alpha_1$ in the case that an A/N only is transmitted, an identical cyclic shift amount ($\alpha_A$) may be used. Further, as $\alpha_1$ ($\alpha_2$) in the case that an SR only is transmitted and $\alpha_1$ in the case that an SR+an A/N are transmitted, an identical cyclic shift amount ($\alpha_A$) may be used. Further, as $\alpha_2$ in the case that an A/N only is transmitted and $\alpha_2$ in the case that an SR+an A/N are transmitted, an identical cyclic shift amount ($\alpha_C$) may be used.

Here, in a case that the allocation method 2 is applied to the terminal apparatus 3, in comparison with a case that at least an A/N is transmitted, in the case that an SR only is transmitted, power allocated to a reference signal sequence doubles. Here, the case that at least an A/N is transmitted may include the case that an A/N only is transmitted, and/or the case that an SR+an A/N are transmitted. This is because $\alpha_1=\alpha_2$ holds and the second term in the right side is added to the first term in the right side. Thus, the base station apparatus 1 is required to change power expected to be received between a case that transmission of an SR only is expected and a case that transmission of at least an A/N is expected. Further, in a case that the base station apparatus 1 expects reception of an SR+an A/N, in a case that the terminal apparatus 3 does not transmit an A/N, in comparison with a case that the terminal apparatus 3 transmits an A/N, power allocated to a reference signal sequence doubles.

The terminal apparatus 3 can change transmit power between the case that an SR only is transmitted and the case that at least an A/N is transmitted. That is, the terminal apparatus 3 can change transmit power in accordance with an allocated cyclic shift. For example, the terminal apparatus 3 can set transmit power in the case that an SR only is transmitted to X times transmit power in the case that at least an A/N is transmitted. For example, X is 2. That is, the terminal apparatus 3 can change transmit power based on a different value X, in accordance with a type of uplink control information to be transmitted.

The terminal apparatus 3 may apply different transmit power control between the case that an SR only is transmitted and the case that at least an A/N is transmitted. That is, the terminal apparatus 3 may apply different transmit power control in accordance with an allocated cyclic shift. For example, transmit power control applied in the case that at least an A/N is transmitted may be based on Equation (1) and Equation (2), and transmit power control applied in the case that an SR only is transmitted may be a method not based on Equation (1) and Equation (2). For example, the transmit power control applied in the case that an SR only is transmitted may be based on Equation (5).

$$P_{real\_PUCCH,c}(i)=P_{O\_PUCCH,c}+PL_c+h(n_{CQI},n_{HARQ})+\Delta_{F\_PUCCH}(F)+g(i)+X_2 \quad \text{[Equation 5]}$$

A new parameter for offset $X_2$ is introduced in Equation (5), compared with Equation (2). For example, the parameter for offset $X_2$ may be 0 in a case of being applied in the case that at least an A/N is transmitted, and may be $-10*\text{Log}_{10}(2)$ in a case of being applied in the case an SR only is transmitted. That is, the parameter for offset may be different based on a type of uplink control information to be transmitted. Further, an equation used for transmit power control applied in a case that a terminal apparatus transmits an sPUCCH may be different in accordance with uplink control information to be transmitted.

The terminal apparatus 3 may use parameters for different transmit power control between the case that an SR only is transmitted and the case that at least an A/N is transmitted. That is, the terminal apparatus 3 may apply different transmit power control information in accordance with an allocated cyclic shift.

Here, for example, the transmit power control control information may include $P_{c\_max,c}$, $PL_c$, $h(n_{CQI}, n_{HARQ})$, $n_{CQI}$, $n_{HARQ}$, $\Delta_{F\_PUCCH}(F)$, $g(i)$, $\delta_{PUCCH}$, and/or $K_{PUCCH}$. That is, the terminal apparatus 3 can perform transmit power control of an sPUCCH based on the transmit power control information.

The terminal apparatus 3 can apply different transmit power control, based on the number of SC-FDMA symbols having an sPUCCH/PUCCH. For example, the terminal apparatus 3, in a case that the number of SC-FDMA symbols having an sPUCCH/PUCCH is equal to or less than $N_{sPUCCH}$, may apply different transmit power control to an sPUCCH/PUCCH in accordance with uplink control information, and in a case that the number of SC-FDMA symbols having an sPUCCH/PUCCH is greater than $N_{sPUCCH}$, may apply transmit power control that is independent of uplink control information and is based on Equation (1) and Equation (2) to an sPUCCH/PUCCH. Further, in another example, the terminal apparatus 3 may apply transmit power control based on a function or a table that associates the number of SC-FDMA symbols $N_{sPUCCH}$ having an sPUCCH/PUCCH with transmit power.

The terminal apparatus 3 can apply different transmit power control, based on a bandwidth of an sPUCCH/PUCCH. For example, the terminal apparatus 3, in a case that a bandwidth of an sPUCCH/PUCCH is equal to or less than $W_{sPUCCH}$, may apply different transmit power control to an sPUCCH/PUCCH in accordance with uplink control information, and in a case that a bandwidth of an sPUCCH/PUCCH is greater than $W_{sPUCCH}$, may apply transmit power control that is independent of uplink control information and is based on Equation (1) and Equation (2) to an sPUCCH/PUCCH. Further, in another example, the terminal apparatus 3 may apply transmit power control based on a function or a table that associates a bandwidth $W_{sPUCCH}$ of an sPUCCH/PUCCH with transmit power.

For example, the base station apparatus 1, may transmit (configure) transmit power control information (a parameter, an index, a table, an equation, a calculation method, etc.) used in each of the case that an SR only is transmitted by the terminal apparatus 3 and the case that at least an A/R is transmitted, using higher layer signaling (RRC signalling), downlink control information (DCI), a PDCCH, and/or a PDSCH, and the like.

Figure 8:
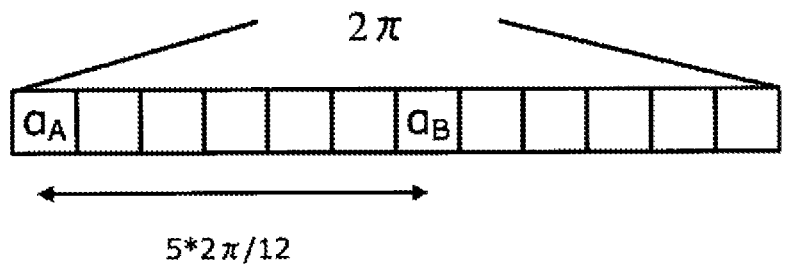
FIG. 8 is a diagram illustrating an example of relationship among $\alpha_A$, $\alpha_B$ and $\alpha_C$ on an sPUCCH according to the present embodiment.
Figure 8:
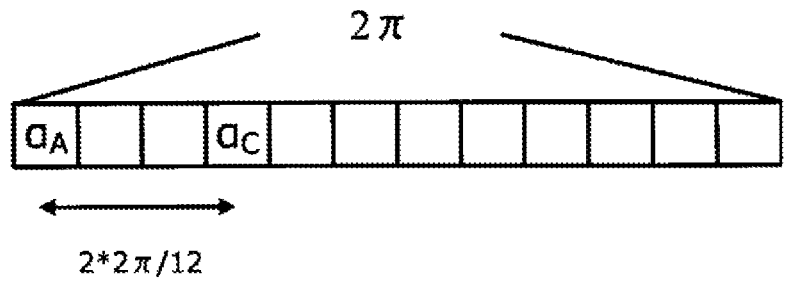
Figure 8:
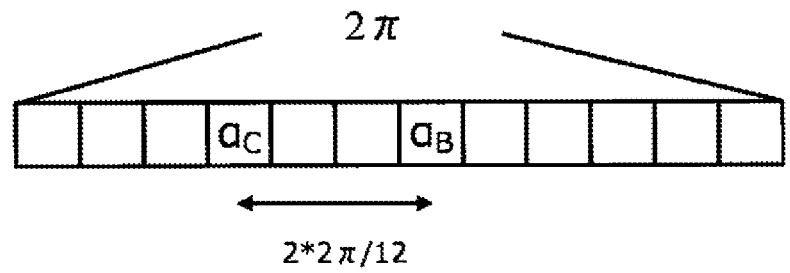

Next, relationship among the cyclic shifts $\alpha_A$, $\alpha_B$, and $\alpha_C$ will be described. FIG. 8 is a diagram illustrating an example of relationship (cyclic shift relationship 1) among $\alpha_A$, $\alpha_B$, and $\alpha_C$ of an sPUCCH based on the allocation method 1 or the allocation method 2. Note that, in an sPUCCH based on the allocation method 2, $\alpha_B$ may be considered not to be given in the case that an SR only is transmitted. In the example illustrated in FIG. 8, in a case that each piece of uplink control information is transmitted, the cyclic shifts $\alpha_A$, $\alpha_B$, and $\alpha_C$ do not change. Accordingly, an advantage such as an easy implementation is expected. On the other hand, in the case that at least A/N is transmitted, an interval of a frequency domain between two cyclic shifts is $2*N_d$, and thus detection precision of the base station apparatus 1 becomes a problem. Here, $N_d$ is a unit of cyclic shift, and is, for example, a phase rotation amount ($2\pi/12$, etc. may be used). That is, the cyclic shift may be a phase rotation in a time direction (or a frequency direction).

Figure 9:
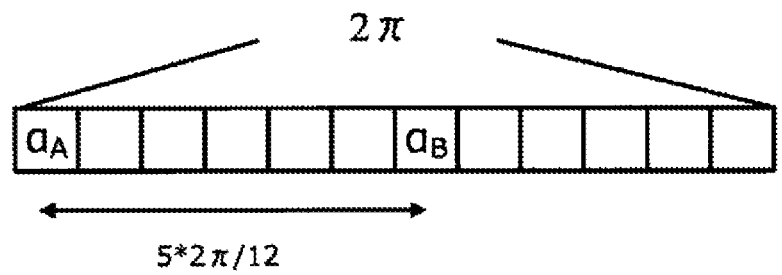
FIG. 9 is a diagram illustrating an example of the relationship among $\alpha_A$, $\alpha_B$, and $\alpha_C$ on the sPUCCH according to the present embodiment.
Figure 9:
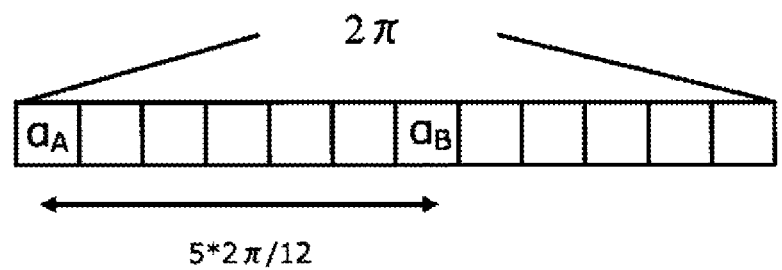
Figure 9:
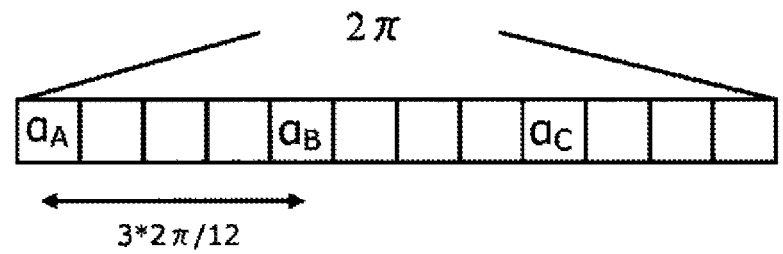

FIG. 9 is a diagram illustrating another example of the relationship (cyclic shift relationship 2) among $\alpha_A$, $\alpha_B$, and $\alpha_C$ of the sPUCCH based on the allocation method 1 or the allocation method 2. The cyclic shift relationship 2 is an example in which values (and relationship) of $\alpha_A$, $\alpha_B$, and $\alpha_C$ are different in accordance with uplink control information expected by the base station apparatus 1. Accordingly, in the case that transmission of an A/N only is expected, an interval of a frequency domain between the two cyclic shifts $\alpha_A$ and $\alpha_B$ is $5*N_d$, and in the case that transmission of an SR+an A/N is expected, intervals of frequency domains among respective cyclic shifts $\alpha_A$, $\alpha_B$, and $\alpha_C$ are $3*N_d$, so that improvement of the detection precision of the base station apparatus 1 is expected. That is, for example, $\alpha_A$, $\alpha_B$, and $\alpha_C$ may have a relation of $\alpha_B = \alpha_A + \Delta_1$ in the case that transmission of an SR only is expected and/or in the case that transmission of A/N only is expected, and may have a relation of $\alpha_C = 2*\Delta_2 + \alpha_A = \Delta_2 + \alpha_B$ in the case that transmission of an SR+A/N is expected. $\Delta_1$ may be configured such that an interval (or a difference) between $\alpha_A$ and $\alpha_B$ is maximized. Further, $\Delta_2$ may be configured such that intervals (or differences) among $\alpha_A$, $\alpha_B$ and $\alpha_C$ are maximized. Further, for example, $\alpha_A$, $\alpha_B$, and $\alpha_C$, in the case that transmission of an SR+an A/N is expected, may have relations $\alpha_C = \Delta_{2B} + \alpha_B$, $\alpha_B = \Delta_{2A} + \alpha_{2A}$. Here, $\Delta_{2B}$ may be configured such that an interval (or a difference) between $\alpha_B$ and $\alpha_C$ is maximized. Further, here, $\Delta_{2A}$ may be configured such that an interval (or the difference) between $\alpha_A$ and $\alpha_B$ is maximized.

That is, the terminal apparatus 3 can change a cyclic shift according to an sPUCCH configuration, depending on a type of uplink control information that the base station apparatus 1 expects to be transmitted, a subframe number, an sTTI number, an sTTI length, or the like. Note that, CS control information (a value or a configuration method of a value, a parameter for calculating a value, or the like) for the cyclic shift according to the sPUCCH configuration, may be based on higher layer signaling (RRC signalling), Downlink Control Information (DCI), an sPDCCH/PDCCH and/or an sPDSCH/PDSCH, or the like, transmitted by the base station apparatus 1. Here, the CS control information may be information related to some or all of $\alpha_1$, $\alpha_2$, $\alpha_A$, $\alpha_B$, and $\alpha_C$.

Note that, the relationship among the cyclic shifts may not necessarily be based on the intervals of the frequency domains. For example, from a viewpoint of the terminal apparatus 3, based on performance of the sequence $S_1$ generated based on Equation (4) (e.g., Peak to Average Power Ration (PAPR), Cubic Metric (CM), or the like), relationship among cyclic shifts or the values of $\alpha_A$, $\alpha_B$, and $\alpha_C$ may be configured. Further, the performance of the sequence S1 may be a value calculated by computer simulation or the like, and the relationship among the cyclic shifts or the values of $\alpha_A$, $\alpha_B$, and $\alpha_C$ may be based on computer simulation (also referred to as a Computer Generated Sequence (CGS) or the like).

An example of an allocation method of a cyclic shift to uplink control information in an sPUCCH based on the method 1 (hereinafter, an allocation method 3) is ($\alpha_1$, $\alpha_2$)=($\alpha_A$, $\alpha_B$), and resource indices (indices for specifying a frequency, a time, a space, etc.) in the case that transmission of an SR is expected are different from those in the case that transmission of an A/N is expected. For example, RBs used for transmitting an sPUCCH in the case that transmission of an SR is expected can be different from those in the case that transmission of an A/N is expected. Additionally, in the case that transmission of an SR+ an A/N is expected, for example, resource indices in the case that at least an SR is transmitted can be different from those in the case that an A/N only is transmitted.

Another example of a method of an sPUCCH according to the present embodiment (a method 2) may be determined based on Equation (6).

$$S_2(n) = r'_{u,v}(n) e^{j\alpha n} \quad \text{[Equation 6]}$$

In the method 2, a sequence to which a cyclic shift is applied is arranged alone in a single SC-FMDA symbol. That is, the method 2 may be a method in which a single sequence to which a cyclic shift is multiplied (applied) is included in a single SC-FMDA symbol. An sPUCCH sequence $S_2$ transmitted by the terminal apparatus 3 can be received by the base station apparatus 1. For example, the base station apparatus 1, by performing correlation processing for the received sPUCCH sequence $S_2$ with r(n), can detect the cyclic shift $\alpha$.

Figure 10:
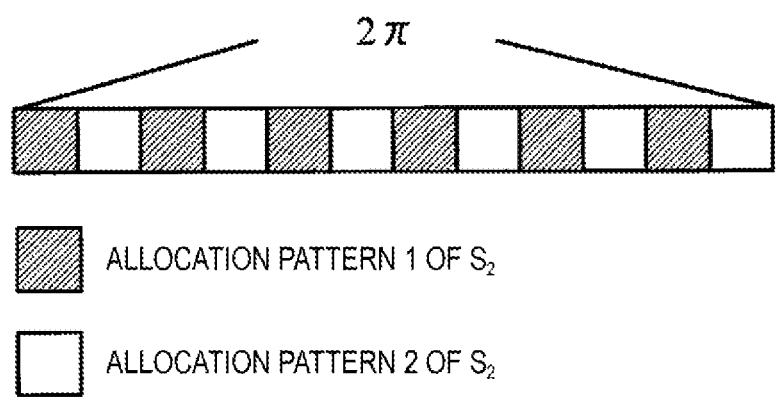
FIG. 10 is a diagram illustrating an example of a PUCCH configuration for performing a reception acknowledgment of downlink data allocated to an sTTI according to the present embodiment.

As illustrated in shaded areas in FIG. 10, in the method 2, sequences can be allocated in a single SC-FDMA symbol in a comb-like pattern (Interlace). For example, as illustrated in FIG. 10, in the case that sequences are allocated in a comb-like pattern, two allocation patterns can be generated. Here, an allocation pattern 1 in FIG. 10 is also referred to as an allocation pattern X1. Further, an allocation pattern 2 in FIG. 10 is also referred to as an allocation pattern X2. Note that, the method 2 is not limited to the example in FIG. 10, and may generate two or more allocation patterns by providing two or more intervals in a comb-like pattern. Note that, the method 2 may be based on an equation other than Equation (5), for example, and may be a similar method to a generation method of an SRS. Note that, hereinafter, in the method 2, a description will be given taking an sPUCCH configuration as shown in FIG. 10 as an example. Further, in the method illustrated in the method 2, in each allocation pattern, an sPUCCH may be configured to include sequences composed of sequences subjected to an identical cyclic shift or different cyclic shifts.

In an example of cyclic shifts $\alpha_1^2$ and $\alpha_2^2$ configured for the allocation patterns X1 and X2 to uplink control information in an sPUCCH based on the method 2 (hereinafter, an allocation method 4), for example, in the case that an SR only is transmitted, $(\alpha_1^2, \alpha_2^2) = (\alpha_A, \text{null})$ may hold. Further, in the case that an A/N only is transmitted, $(\alpha_1^2, \alpha_2^2) = (\alpha_A, \alpha_B)$ may hold. Further, in the case that an SR+ an A/N are transmitted, $(\alpha_1^2, \alpha_2^2) = (\alpha_A, \alpha_C)$ may hold.

That is, as $\alpha_1^2$ in the case that an SR only is transmitted, $\alpha_1^2$ in the case that an A/N only is transmitted, and $\alpha_1^2$ in the case that an A/N only is transmitted, an identical cyclic shift amount $(\alpha_A)$ may be used.

Here, null may indicate that no cyclic shift is allocated and no sequence is generated. Note that, in the case that an SR only is transmitted, $(\alpha_1^2, \alpha_2^2) = (\alpha_A, \alpha_A)$ may be configured. Further, in the case that an SR only is transmitted, $(\alpha_1^2, \alpha_2^2) = (\alpha_A, \alpha_D)$ may be configured. Note that, hereinafter, a sequence generated based on Equation (5) or other equations (or rules) used for the allocation pattern X1 is also referred to as a first (or a second) sequence, and a cyclic shift $\alpha_1$ applied to the first sequence is also referred to as a first (or a second) cyclic shift. Further, a sequence generated based on Equation (5) or other equations (or rules) used for the allocation pattern X2 is also referred to as the second (or the first) sequence, and a cyclic shift $\alpha_2$ applied to the second sequence is also referred to as the second (or the first) cyclic shift.

Here, in a case that the allocation method 4 is applied to the terminal apparatus 3, in comparison with the case that at least an A/N is transmitted, in the case that an SR only is transmitted, power (allocated power) per an allocation pattern doubles. This is because the allocation pattern 2 is not allocated in the case of an SR only. Thus, the base station apparatus 1 is required to change power expected to be received between a case that transmission of an SR only is expected and a case that transmission of at least an A/N is expected. Further, in the case that the base station apparatus 1 expects reception of an SR+an A/N, in the case that the terminal apparatus 3 does not transmit an A/N, in comparison with the case that the terminal apparatus 3 transmits an A/N, power allocated to a reference signal sequence doubles.

The terminal apparatus 3, in a case that the allocation method 4 is applied, may determine transmit power by using a similar method to a case that the allocation method 2 is applied.

The method 1 and the method 2 are capable of having in a single SC-FDMA symbol. Additionally, mapping of an identical sequence to different frequency bands (frequency hopping, etc.) may be applied to a sequence generated based on the method 1 or the method 2. Here, the sequences to which the frequency hopping is applied is not required to be an identical sequence in a strict manner. For example, the frequency hopping may be applied to different sequences including an identical information.

Figure 11:
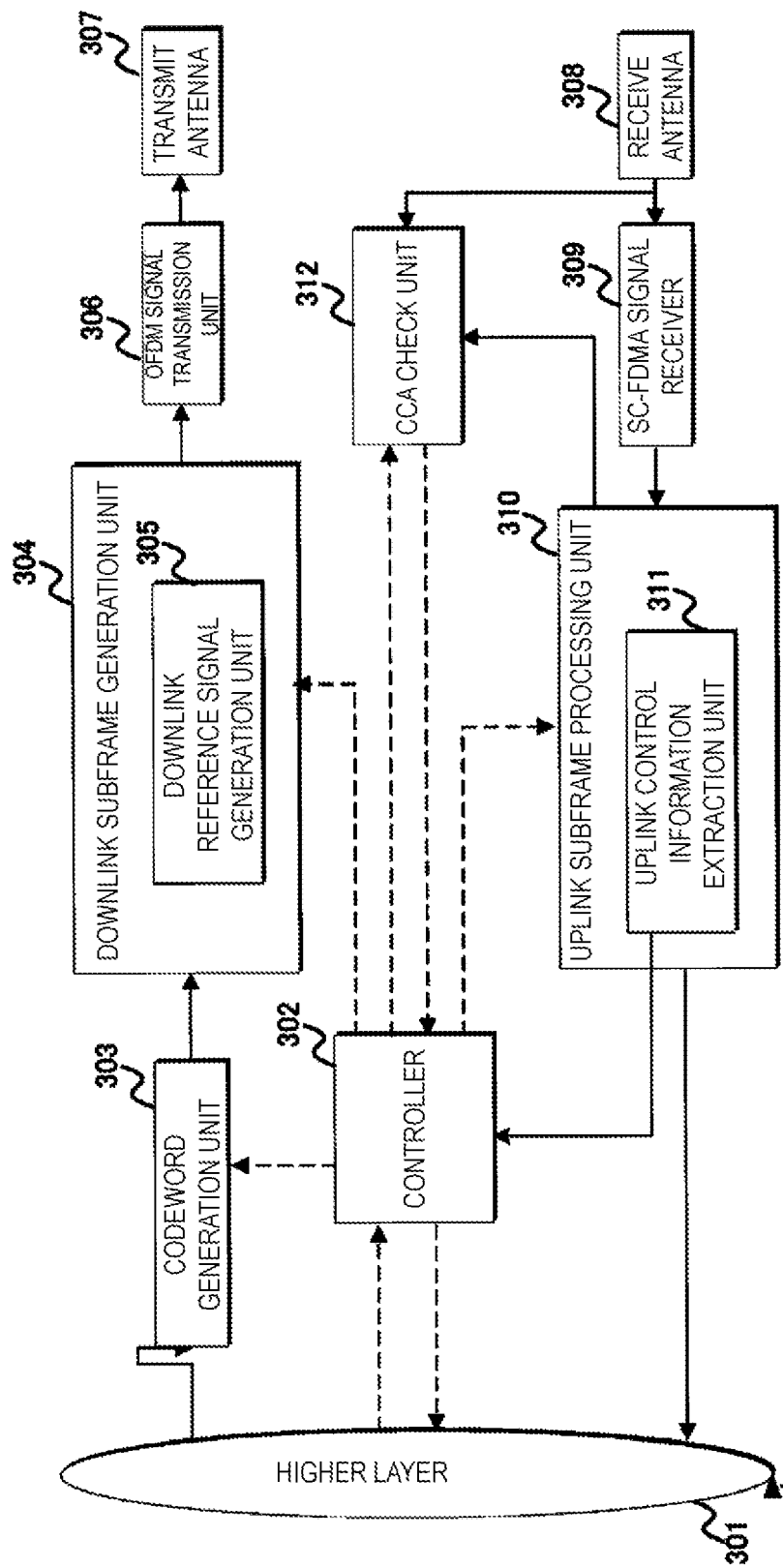
FIG. 11 is a schematic diagram illustrating an example of a block configuration of a base station apparatus according to the present embodiment.

FIG. 11 is a schematic diagram illustrating an example of a block configuration of the base station apparatus 1 according to the present embodiment. The base station apparatus 1 includes a higher layer (higher layer control information notification unit, higher layer processing unit) 301, a controller (base station controller) 302, a codeword generation unit 303, a downlink subframe generation unit 304, an OFDM signal transmission unit (downlink transmitter) 306, a transmit antenna (base station transmit antenna) 307, a receive antenna (base station receive antenna) 308, an SC-FDMA signal receiver (CSI receiver) 309, and an uplink subframe processing unit 310. The downlink subframe generation unit 304 includes a downlink reference signal generation unit 305. Moreover, the uplink subframe processing unit 310 includes an uplink control information extraction unit (CSI acquisition unit) 311.

Figure 12:
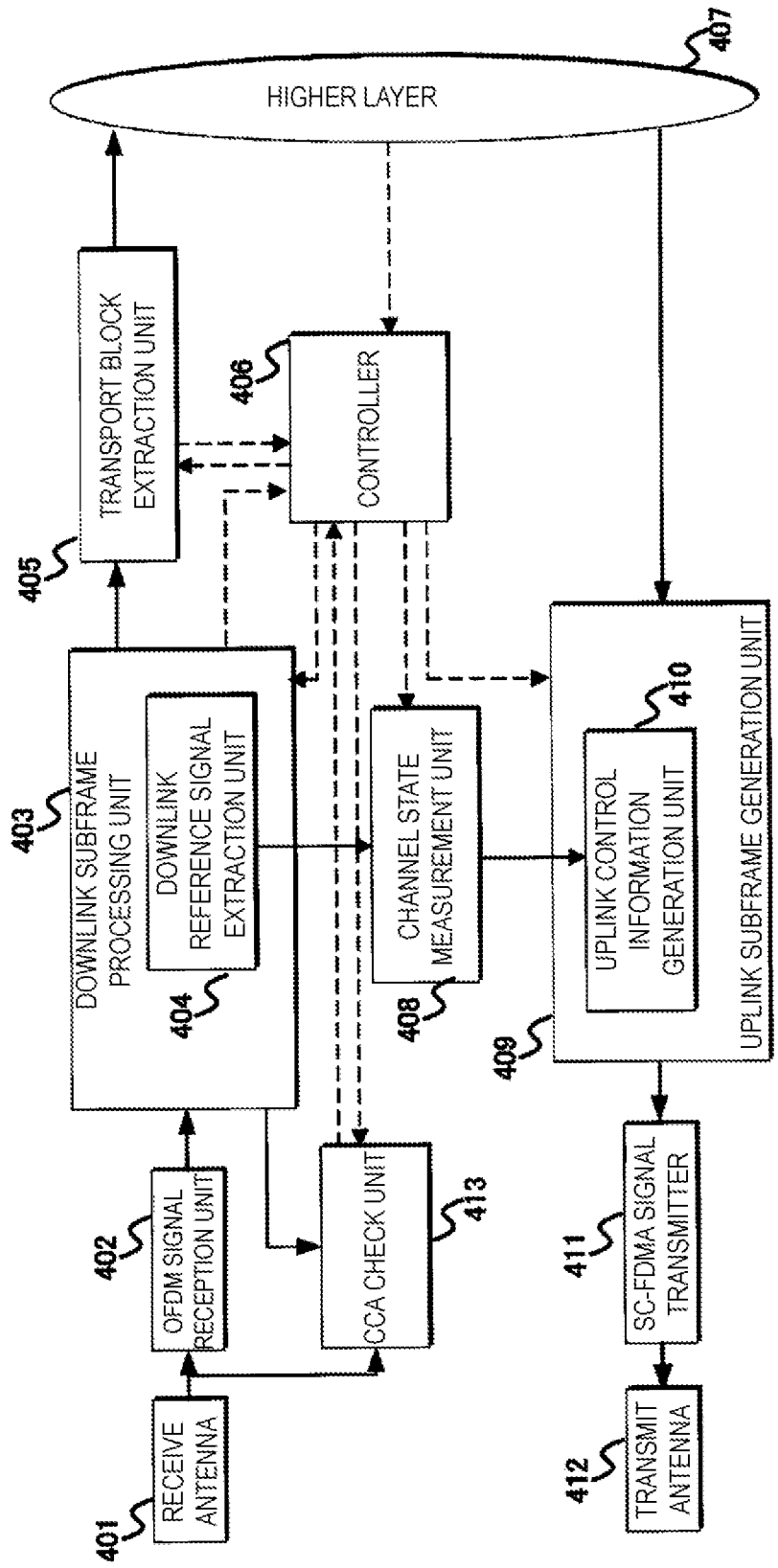
FIG. 12 is a schematic diagram illustrating an example of a block configuration of a terminal apparatus according to the present embodiment.

FIG. 12 is a schematic diagram illustrating an example of a block configuration of the terminal apparatus 3 according to the present embodiment. The terminal apparatus 3 includes a receive antenna (terminal receive antenna) 401, an OFDM signal reception unit (downlink receiver) 402, a downlink subframe processing unit 403, a transport block extraction unit (data extraction unit) 405, a controller (terminal controller) 406, a higher layer (higher-layer control information acquisition unit, higher layer processing unit) 407, a channel state measurement unit (CSI generation unit) 408, an uplink subframe generation unit 409, an SC-FDMA signal transmitter (UCI transmitter) 411, and a transmit antenna (terminal transmit antenna) 412. The downlink subframe processing unit 403 includes a downlink reference signal extraction unit 404. Moreover, the uplink subframe generation unit 409 includes an uplink control information generation unit (UCI generation unit) 410.

First, a flow of downlink data transmission and/or reception will be described with reference to FIG. 11 and FIG. 12.

In the base station apparatus 2, the controller 302 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 303 and the downlink subframe generation unit 304, based on these elements. Downlink data (also referred to as a downlink transport block) transmitted from the higher layer 301 is processed through error correction coding, rate matching, and the like in the codeword generation unit 303 under the control of the controller 302 and then, a codeword is generated. Two codewords at maximum are transmitted at the same time in a single subframe of a single cell. The controller 302 instructs the downlink subframe generation unit 304 to generate a downlink subframe. First, a codeword generated in the codeword generation unit 303 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, the transmission data sequence transmitted from the higher layer 301 includes higher-layer control information, which is control information about the higher layer (e.g., dedicated (individual) Radio Resource Control (RRC) signalling). Furthermore, the downlink reference signal generation unit 305 generates a downlink reference signal. The downlink subframe generation unit 304 maps the downlink reference signal to the REs in the downlink subframes in accordance with an instruction from the controller 302. The OFDM signal transmission unit 306 modulates the downlink subframe generated by the downlink subframe generation unit 304 to an OFDM signal, and then transmits the OFDM signal through the transmit antenna 307. Although a configuration of including one OFDM signal transmission unit 306 and one transmit antenna 307 is illustrated as an example here, a configuration of including multiple OFDM signal transmission units 306 and multiple transmit antennas 307 may be employed for transmitting downlink subframes through multiple antenna ports. Furthermore, the downlink subframe generation unit 304 may also have a capability of generating physical layer downlink control channels, such as a PDCCH and an EPDCCH to map the channels to REs in downlink subframes. Multiple base station apparatuses (base station apparatus 1-1 and base station apparatus 1-2) transmit separate downlink subframes.

In the terminal apparatus 3, an OFDM signal is received by the OFDM signal reception unit 402 through the receive antenna 401, and an OFDM demodulation process is performed on the signal. The downlink subframe processing unit 403 first detects physical layer downlink control channels, such as a PDCCH and an EPDCCH. More specifically, the downlink subframe processing unit 403 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 403 monitors a PDCCH and an EPDCCH. In a case that the CRC bits match an ID (a single terminal-specific identifier assigned to a single terminal apparatus, such as a Cell-Radio Network Temporary Identifier (C-RNTI) or a Semi Persistent Scheduling-C-RNTI (SPS-C-RNTI), or a Temporary C-RNTI) assigned by the base station apparatus beforehand, the downlink subframe processing unit 403 recognizes that a PDCCH or an EPDCCH has been detected and extracts a PDSCH by using control information included in the detected PDCCH or EPDCCH. The controller 406 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 403, the transport block extraction unit 405, and the like, in accordance with these elements. More specifically, the controller 406 performs control so as to perform an RE mapping process in the downlink subframe generation unit 304, an RE demapping process and demodulation process corresponding to the modulation process, and the like. The PDSCH extracted from the received downlink subframe is transmitted to the transport block extraction unit 405. Furthermore, the downlink reference signal extraction unit 404 in the downlink subframe processing unit 403 extracts the downlink reference signal from the downlink subframe. The transport block extraction unit 405 extracts a transport block that has been subjected to a rate matching process, a rate matching process corresponding to error correction coding, error correction decoding, and the like in the codeword generation unit 303, and transmits the extracted transport block to the higher layer 407. The transport block includes higher-layer control information, and the higher layer 407 notifies the controller 406 of a necessary physical layer parameter, based on the higher-layer control information. The multiple base station apparatuses 1 (base station apparatus 1-1 and base station apparatus 1-2) transmit separate downlink subframes, and the terminal apparatus 3 receives the downlink subframes. Hence, the above-described processes may be performed for the downlink subframe of each of the multiple base station apparatuses 1. In this situation, the terminal apparatus 3 may recognize or may not necessarily recognize that multiple downlink subframes have been transmitted from the multiple base station apparatuses 2. In a case of no recognition, the terminal apparatus 3 may simply recognize that multiple downlink subframes have been transmitted in multiple cells. Moreover, the transport block extraction unit 405 determines whether the transport block has been detected correctly, and transmits a determination result to the controller 406.

Next, a flow of uplink signal transmission and/or reception will be described. In the terminal apparatus 3, the controller 406 instructs the downlink reference signal extraction unit 404 to transmit a downlink reference signal extracted by the downlink reference signal extraction unit 404 to the channel state measurement unit 408, and then instructs the channel state measurement unit 408 to measure the channel state and/or interference, and further to calculate CSI, based on the measured channel state and/or interference. The controller 406 instructs the uplink control information generation unit 410 to generate an HARQ-ACK (DTX (not transmitted yet), ACK (detection success), or NACK (detection failure)) and to map the HARQ-ACK to a downlink subframe, based on a determination result of whether the transport block is correctly detected. The terminal apparatus 3 performs these processes on the downlink subframe of each of multiple cells. In the uplink control information generation unit 410, a PUCCH including the calculated CSI and/or HARQ-ACK is generated. In the uplink subframe generation unit 409, the PUSCH including the uplink data transmitted from the higher layer 407 and the PUCCH generated by the uplink control information generation unit 410 are mapped to RBs in an uplink subframe, and an uplink subframe is generated. The uplink subframe is subjected to the SC-FDMA modulation in the SC-FDMA signal transmitter 411 to generate an SC-FDMA signal, and the SC-FDMA signal transmission unit 411 transmits the SC-FDMA signal via the transmit antenna 412.

Moreover, although the description has been given in each of the above-described embodiments by using the terms "primary cell" and "PS cell", these terms may not be necessarily used. For example, "primary cell" in each of the above-described embodiments may be referred to as "master cell", and "PS cell" in each of the above-described embodiments may be referred to as "primary cell".

Hereinafter, various aspects of the terminal apparatus 3 and the base station apparatus 1 in the present embodiment will be described.

(1) A first aspect of the present embodiment is a terminal apparatus 3 that includes a transmitter configured to transmit an uplink signal on a PUCCH corresponding to a single SC-FDMA symbol, and a controller configured to determine transmit power for transmission on the PUCCH, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(2) In the first aspect of the present embodiment, the uplink signal is transmitted in a first frequency band, and the transmitter transmits the uplink signal, in a second frequency band different from the first frequency band.

(3) A second aspect of the present embodiment is a base station apparatus 1 that includes a receiver configured to receive an uplink signal on a PUCCH corresponding to a single SC-FDMA symbol, and a controller configured to indicate transmit power for the PUCCH to a terminal apparatus, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(4) In the second aspect of the present embodiment, the uplink signal is received in a first frequency band, and the receiver receives the uplink signal, in a second frequency band different from the first frequency band.

(5) A third aspect of the present embodiment is a communication method used for a terminal apparatus 3, the method generating a first sequence by applying a first cyclic shift to a third sequence, generating a second sequence by applying a second cyclic shift to the third sequence, generating an uplink signal based on a first sequence and a second sequence, determining transmit power on the PUCCH based on a value of the first cyclic shift and a value of the second cyclic shift, and transmitting an uplink signal on a PUCCH corresponding to a single SC-FDMA symbol.

(6) In the third aspect of the present embodiment, the uplink signal is transmitted in a first frequency band, and the uplink signal is transmitted in a second frequency band different from the first frequency band.

(7) A fourth aspect of the present embodiment is an integrated circuit to be mounted on a terminal apparatus 3 that includes a transmission circuit configured to transmit an uplink signal on a PUCCH corresponding to a single SC-FDMA symbol, and a control circuit configured to determine transmit power for transmission on the PUCCH, in which the uplink signal is generated based on a first sequence and a second sequence, the first sequence is given by applying a first cyclic shift to a third sequence, the second sequence is given by applying a second cyclic shift to the third sequence, and transmit power for transmission on the PUCCH is given based on a value of the first cyclic shift and a value of the second cyclic shift.

(8) In the fourth aspect of the present embodiment, the uplink signal is transmitted in a first frequency band, and the transmission circuit transmits the uplink signal, in a second frequency band different from the first frequency band.

(9) A fifth aspect of the present embodiment is a terminal apparatus 3 that includes a transmitter configured to transmit an uplink signal on a PUCCH corresponding to a single SC-FDMA symbol, and a controller configured to determine a cyclic shift for transmission on the PUCCH, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

(10) In the fifth aspect of the present embodiment, the uplink signal is transmitted in a first frequency band, and the transmitter transmits the uplink signal, in a second frequency band different from the first frequency band.

(11) In the fifth aspect of the present embodiment, the uplink signal is generated based on the SR only, the HARQ-ACK only, or both the SR and the HARQ-ACK.

(12) A sixth aspect of the present embodiment is a base station apparatus 1 that includes a receiver configured to receive an uplink signal on a PUCCH corresponding to a single SC-FDMA symbol, and a controller configured to indicate a cyclic shift for the PUCCH to a terminal apparatus, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

(13) In the sixth aspect of the present embodiment, the uplink signal is received in a first frequency band, and the receiver receives the uplink signal, in a second frequency band different from the first frequency band.

(14) In the sixth aspect of the present embodiment, the uplink signal is generated based on the SR only, the HARQ-ACK only, or both the SR and the HARQ-ACK.

(15) A seventh aspect of the present embodiment is a communication method for a terminal apparatus 3, the method generating a value of a first cyclic shift and a value of a second cyclic shift based on which of an SR only, HARG-AKC only, and both an SR and HARQ-ACK are transmitted on the PUCCH, generating a first sequence by applying the first cyclic shift to a third sequence, generating a second sequence by applying the second cyclic shift to the third sequence, generating an uplink signal based on the first sequence and the second sequence, and transmitting the uplink signal on a PUCCH corresponding to a single SC-FDMA symbol.

(16) In the seventh aspect of the present embodiment, the uplink signal is transmitted in a first frequency band, and the uplink signal is transmitted in a second frequency band different from the first frequency band.

(17) In the seventh aspect of the present embodiment, the uplink signal is generated based on the SR only, the HARQ-ACK only, or both the SR and the HARQ-ACK.

(18) An eighth aspect of the present embodiment is an integrated circuit to be mounted on a terminal apparatus 3 that includes a transmission circuit configured to transmit an uplink signal on a PUCCH corresponding to a single SC-FDMA symbol, and a control circuit configured to determine a cyclic shift for transmission on the PUCCH, in which the uplink signal is generated based on the first sequence and a second sequence, the first sequence is given by applying a first cyclic shift to a third sequence, the second sequence is given by applying a second cyclic shift to the third sequence, and a value of the first cyclic shift and a value of the second cyclic shift are given based on which of an SR only, HARQ-ACK only, and both an SR and HARQ-ACK are transmitted on the PUCCH.

(19) In the eighth aspect of the present embodiment, the uplink signal is transmitted in a first frequency band, and the transmission circuit transmits the uplink signal, in a second frequency band different from the first frequency band.

(20) In the eighth aspect of the present embodiment, the uplink signal is generated based on the SR only, the HARQ-ACK only, or both the SR and the HARQ-ACK.

A program running on each of the base station apparatus 1 and the terminal apparatus 3 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and in a case that it is necessary, is read by the CPU to be modified or rewritten.

Moreover, the terminal apparatus 3 and the base station apparatus 1-1 or the base station apparatus 1-2 according to the above-described embodiments may be partially achieved by the computer. In this case, this configuration may be achieved by recording a program for enabling such control functions on a computer-readable recording medium and causing a computer system to read the program recorded on the recording medium for execution.

Moreover, the "computer system" here is defined as a computer system built into the terminal apparatus 3 or the base station apparatus 1-1 or the base station apparatus 1-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to enable some of the functions described above, and also may be configured to be capable of enabling the functions described above in combination with a program already recorded in the computer system.

Furthermore, the base station apparatus 1 according to the above-described embodiment is achieved as an aggregation (a device group) including multiple devices. Each of the devices having such a device group may include some or all portions of each function or each functional block of the base station apparatus 1 according to the above-described embodiment. The device group may include a series of functions or functional blocks of the base station apparatus 1. Furthermore, the terminal apparatus 3 according to the above-described embodiment can also communicate with the base station apparatus as the aggregation.

Furthermore, the base station apparatus 1-1 or the base station apparatus 1-2 according to the above-described embodiments may be an Evolved Universal Terrestrial Radio Access Network (EUTRAN). Furthermore, the base station apparatus 2-1 or the base station apparatus 2-2 according to the above-described embodiments may have some or all portions of a function of a higher node for an eNodeB.

Furthermore, some or all portions of each of the terminal apparatus 3 and the base station apparatus 1-1 or base station apparatus 1-2 according to the above-described embodiments may be typically achieved as a Large-Scale Integration (LSI) that is an integrated circuit or may be achieved as a chip set. The functional blocks of each of the terminal apparatus 3 and the base station apparatus 1-1 or base station apparatus 1-2 may be individually enabled as a chip, or some or all of the functional blocks may be integrated into a chip. Furthermore, a circuit integration technique is not limited to the LSI, and may be achieved with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal apparatus or a communication device, but the present invention is not limited to this, and can be applied to a fixed-type electronic apparatus installed indoors or outdoors, or a stationary-type electronic apparatus, for example, a terminal apparatus or a communication device, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST

301 Higher layer
302 Controller
303 Codeword generation unit
304 Downlink subframe generation unit 305 Downlink reference signal generation unit
306 OFDM signal transmission unit
307 Transmit antenna
308 Receive antenna
309 SC-FDMA signal receiver
310 Uplink subframe processing unit
311 Uplink control information extraction unit
401 Receive antenna
402 OFDM signal reception unit
403 Downlink subframe processing unit
404 Downlink reference signal extraction unit
405 Transport block extraction unit
406 Controller
407 Higher layer
408 Channel state measurement unit
409 Uplink subframe generation unit
410 Uplink control information generation unit
411 SC-FDMA signal transmitter
412 Transmit antenna
1 (1-1, 1-2) Base station apparatus
3 (3A, 3B) Terminal apparatus
100 Communication system

What is claimed is:

1. A terminal apparatus comprising:
reception circuitry configured to receive a Physical Downlink Shared CHannel (PDSCH); and
transmission circuitry configured to transmit at least a Hybrid-Automatic Repeat reQuest-ACKnowledgement (HARQ-ACK) and a Scheduling Request (SR) on a Physical Uplink Control CHannel (PUCCH),
wherein
a first sequence for the PUCCH is given based on a second sequence multiplied by a cyclic shift,
a value of the cyclic shift indicates whether the SR is a positive SR or a negative SR and whether the HARQ-ACK is an ACK or a negative ACKnowledgement (NACK), and
the value is given based on whether the SR is transmitted with the HARQ-ACK on the PUCCH.

2. The terminal apparatus according to claim 1, wherein
the value is a first value in a case that the SR or the HARQ-ACK is transmitted, and
the value is a second value which is different from the first value in a case that the SR and the HARQ-ACK are transmitted.

3. A base station apparatus comprising:
transmission circuitry configured to transmit a Physical Downlink Shared CHannel (PDSCH); and
reception circuitry configured to receive at least a Hybrid-Automatic Repeat reQuest-ACKnowledgement (HARQ-ACK) and a Scheduling Request (SR) on a Physical Uplink Control CHannel (PUCCH),
wherein
a first sequence for the PUCCH is given based on a second sequence multiplied by a cyclic shift,
a value of the cyclic shift indicates whether the SR is a positive SR or a negative SR and whether the HARQ-ACK is an ACK or a negative ACKnowledgement (NACK), and
the value is given based on whether the SR is transmitted with the HARQ-ACK on the PUCCH.

4. The base station apparatus according to claim 3, wherein
the value is a first value in a case that the SR or the HARQ-ACK is transmitted, and
the value is a second value which is different from the first value in a case that the SR and the HARQ-ACK are transmitted.

5. A communication method used for a terminal apparatus, the method comprising:
receiving a Physical Downlink Shared CHannel (PDSCH); and
transmitting at least a Hybrid-Automatic Repeat reQuest-ACKnowledgement (HARQ-ACK) and a Scheduling Request (SR) on a Physical Uplink Control CHannel (PUCCH),
wherein
a first sequence for the PUCCH is given based on a second sequence multiplied by a cyclic shift,
a value of the cyclic shift indicates whether the SR is a positive SR or a negative SR and whether the HARQ-ACK is an ACK or a negative ACKnowledgement (NACK), and
the value is given based on whether the SR is transmitted with the HARQ-ACK on the PUCCH.

6. A communication method used for a base station apparatus, the method comprising:
transmitting a Physical Downlink Shared CHannel (PDSCH); and
receiving at least a Hybrid-Automatic Repeat reQuest-ACKnowledgement (HARQ-ACK) and a Scheduling Request (SR) on a Physical Uplink Control CHannel (PUCCH),
wherein
a first sequence for the PUCCH is given based on a second sequence multiplied by a cyclic shift,
a value of the cyclic shift indicates whether the SR is a positive SR or a negative SR and whether the HARQ-ACK is an ACK or a negative ACKnowledgement (NACK), and
the value is given based on whether the SR is transmitted with the HARQ-ACK on the PUCCH.

* * * * *